United States Patent
Yokoi

(10) Patent No.: US 8,578,140 B2
(45) Date of Patent: Nov. 5, 2013

(54) BRANCH PREDICTION APPARATUS OF COMPUTER STORING PLURAL BRANCH DESTINATION ADDRESSES

(75) Inventor: Megumi Yokoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 208 days.

(21) Appl. No.: 12/196,486

(22) Filed: Aug. 22, 2008

(65) Prior Publication Data

US 2008/0320288 A1 Dec. 25, 2008

Related U.S. Application Data

(63) Continuation of application No. PCT/JP2006/303769, filed on Feb. 28, 2006.

(51) Int. Cl.
*G06F 9/00* (2006.01)

(52) U.S. Cl.
USPC ............................................. 712/239

(58) Field of Classification Search
USPC ........................................... 712/239
See application file for complete search history.

(56) References Cited

U.S. PATENT DOCUMENTS

| | | | | |
|---|---|---|---|---|
| 5,414,822 A | * | 5/1995 | Saito et al. | 712/240 |
| 5,434,985 A | * | 7/1995 | Emma et al. | 712/240 |
| 5,706,492 A | * | 1/1998 | Hoyt et al. | 712/238 |
| 5,758,143 A | | 5/1998 | Levitan | 395/587 |
| 5,802,602 A | | 9/1998 | Rahman | 711/204 |
| 5,835,754 A | | 11/1998 | Nakanishi | 395/586 |
| 6,088,793 A | | 7/2000 | Liu | 712/239 |
| 6,532,534 B1 | | 3/2003 | Sunayama et al. | 712/240 |
| 7,007,136 B2 | | 2/2006 | Yokoi et al. | 711/133 |
| 2002/0188834 A1 | | 12/2002 | McDonald | 712/238 |
| 2004/0003176 A1 | | 1/2004 | Yokoi et al. | 711/128 |
| 2004/0003218 A1 | | 1/2004 | Ukai | 712/240 |
| 2005/0114636 A1 | | 5/2005 | McDonald | 712/238 |

FOREIGN PATENT DOCUMENTS

| | | |
|---|---|---|
| EP | 1624369 | 2/2006 |
| JP | 6-89173 | 3/1994 |
| JP | 10-133874 | 5/1998 |
| JP | 10-171652 | 6/1998 |
| JP | 2000-172503 | 6/2000 |
| JP | 2004-38298 | 2/2004 |
| JP | 2004-38323 | 2/2004 |

OTHER PUBLICATIONS

International Search Report dated Mar. 22, 2006 in corresponding International Application No. PCT/JP2006/303769 (1 pg).
International Preliminary Report on Patentability issued Sep. 2, 2008 in corresponding International Application No. PCT/JP2006/303769 (8 pp).
Extended European Search Report, mailed May 20, 2009, in corresponding European Application No. 06714898.1 (8 pp.).

* cited by examiner

*Primary Examiner* — Robert Fennema
(74) *Attorney, Agent, or Firm* — Staas & Halsey LLP

(57) ABSTRACT

One aspect of the embodiments utilizes a branch instruction predicting unit includes a history memory to store a branch address as history information, a selecting unit to select a storing place with reference to selection information for selecting either one of storing places when the branch address of the branch instruction is stored as the history information, In the case that there are a plurality of branch addresses to be stored at a storing place, when a first branch address is stored at a storing place, a second branch address is stored at a storing place in accordance with selection information updated by the updating unit.

8 Claims, 17 Drawing Sheets

FIG. 5

| READOUT REPLACE FLAGS | | | | REPLACE TARGET WAYS DETERMINED BY REPLACE FLAGS | | | |
|---|---|---|---|---|---|---|---|
| WAY0 | WAY1 | WAY2 | WAY3 | WAY0 | WAY1 | WAY2 | WAY3 |
| 0 | 0 | 0 | 0 | ○ | | | |
| 1 | 0 | 0 | 0 | | ○ | | |
| 1 | 1 | 0 | 0 | | | ○ | |
| 1 | 1 | 1 | 0 | | | | ○ |
| 1 | 1 | 1 | 1 | ○ | | | |
| 0 | 1 | 1 | 1 | | ○ | | |
| 0 | 0 | 1 | 1 | | | ○ | |
| 0 | 0 | 0 | 1 | | | | ○ |
| 1 | 0 | 1 | 0 | ○ | | | |
| 0 | 0 | 1 | 0 | | ○ | | |
| 0 | 1 | 1 | 0 | | | ○ | |
| 0 | 1 | 0 | 0 | | | | ○ |
| 0 | 1 | 0 | 1 | ○ | | | |
| 1 | 1 | 0 | 1 | | ○ | | |
| 1 | 0 | 0 | 1 | | | ○ | |
| 1 | 0 | 1 | 1 | | | | ○ |

FIG. 6

| READOUT REPLACE FLAGS | | | | FLAG INVERTING WHEN BECOMING REPLACE TARGET WAY DUE TO BEING INVALID | | | |
|---|---|---|---|---|---|---|---|
| WAY0 | WAY1 | WAY2 | WAY3 | WAY0 | WAY1 | WAY2 | WAY3 |
| 0 | 0 | 0 | 0 | INVERT | INVERT | | |
| 1 | 0 | 0 | 0 | | INVERT | INVERT | |
| 1 | 1 | 0 | 0 | | | INVERT | INVERT |
| 1 | 1 | 1 | 0 | INVERT | | | INVERT |
| 1 | 1 | 1 | 1 | INVERT | INVERT | | |
| 0 | 1 | 1 | 1 | | INVERT | INVERT | |
| 0 | 0 | 1 | 1 | | | INVERT | INVERT |
| 0 | 0 | 0 | 1 | INVERT | | | INVERT |
| 1 | 0 | 1 | 0 | INVERT | INVERT | | |
| 0 | 0 | 1 | 0 | | INVERT | INVERT | |
| 0 | 1 | 1 | 0 | | | INVERT | INVERT |
| 0 | 1 | 0 | 0 | INVERT | | | INVERT |
| 0 | 1 | 0 | 1 | INVERT | INVERT | | |
| 1 | 1 | 0 | 1 | | INVERT | INVERT | |
| 1 | 0 | 0 | 1 | | | INVERT | INVERT |
| 1 | 0 | 1 | 1 | INVERT | | | INVERT |

FIG. 8

|       | FIRST BRANCH INSTRUCTION | SECOND BRANCH INSTRUCTION |
|-------|--------------------------|---------------------------|
| (1-1) | HIT                      | NOT HIT                   |
| (1-2) | NOT HIT                  | HIT                       |
| (2)   | NOT HIT                  | NOT HIT                   |

FIG. 9

|           | EXECUTION RESULT | NEXT PREDICTION | EXECUTION RESULT | NEXT PREDICTION |
|-----------|------------------|-----------------|------------------|-----------------|
| PATTERN 1 | N_tk             | N_tk            | N_tk             | N_tk            |
| PATTERN 2 | N_tk             | N_tk            | N_tk             | Tk              |
| PATTERN 3 | N_tk             | N_tk            | Tk               | Tk              |
| PATTERN 4 | N_tk             | Tk              | N_tk             | N_tk            |
| PATTERN 5 | N_tk             | Tk              | N_tk             | Tk              |
| PATTERN 6 | N_tk             | Tk              | Tk               | Tk              |
| PATTERN 7 | Tk               | Tk              | . . . .          | . . . .         |

FIG. 10

|  | FIRST BRANCH INSTRUCTION ( HIT) | | SECOND BRANCH INSTRUCTION (NOT HIT) | |
| --- | --- | --- | --- | --- |
|  | EXECUTION RESULT | NEXT PREDICTION | EXECUTION RESULT | NEXT PREDICTION |
| PATTERN 1 | N_tk | N_tk | N_tk | N_tk |
| PATTERN 2 | N_tk | N_tk | N_tk | Tk |
| PATTERN 3 | N_tk | N_tk | Tk | Tk |
| PATTERN 4 | N_tk | Tk | N_tk | N_tk |
| PATTERN 5 | N_tk | Tk | N_tk | Tk |
| PATTERN 6 | N_tk | Tk | Tk | Tk |
| PATTERN 7 | Tk | Tk | · · · · | · · · · |

FIG. 11

|  | FIRST BRANCH INSTRUCTION (NOT HIT) | | SECOND BRANCH INSTRUCTION (HIT) | |
| --- | --- | --- | --- | --- |
|  | EXECUTION RESULT | NEXT PREDICTION | EXECUTION RESULT | NEXT PREDICTION |
| PATTERN 1 | N_tk | N_tk | N_tk | N_tk |
| PATTERN 2 | N_tk | N_tk | N_tk | Tk |
| PATTERN 3 | N_tk | N_tk | Tk | Tk |
| PATTERN 4 | N_tk | Tk | N_tk | N_tk |
| PATTERN 5 | N_tk | Tk | N_tk | Tk |
| PATTERN 6 | N_tk | Tk | Tk | Tk |
| PATTERN 7 | Tk | Tk | · · · · | · · · · |

*FIG. 12*

|  | FIRST BRANCH INSTRUCTION (NOT HIT) | | SECOND BRANCH INSTRUCTION (NOT HIT) | |
| --- | --- | --- | --- | --- |
|  | EXECUTION RESULT | NEXT PREDICTION | EXECUTION RESULT | NEXT PREDICTION |
| PATTERN 1 | N_tk | N_tk | N_tk | N_tk |
| PATTERN 2 | N_tk | N_tk | N_tk | Tk |
| PATTERN 3 | N_tk | N_tk | Tk | Tk |
| PATTERN 4 | N_tk | Tk | N_tk | N_tk |
| PATTERN 5 | N_tk | Tk | N_tk | Tk |
| PATTERN 6 | N_tk | Tk | Tk | Tk |
| PATTERN 7 | Tk | Tk | · · · · | · · · · |

BRANCH PREDICTION APPARATUS OF COMPUTER STORING PLURAL BRANCH DESTINATION ADDRESSES

CROSS-REFERENCE TO RELATED APPLICATION

This is a continuation of Application PCT/JP2006/303769, filed on Feb. 28, 2006, now pending, the contents of which are herein wholly incorporated by reference.

BACKGROUND

The embodiment relates to a branch prediction mechanism of a computer.

The branch prediction mechanism of the computer predicts a branch destination in the case of executing a branch instruction next by managing an execution history of the branch instructions on the basis of storage addresses (which will hereinafter be termed instruction addresses) in a memory of the instructions executed in the past.

In this case, the branch prediction mechanism determines a set in a storage device based on a set associative system by using a portion of the instruction address (a branch source address) with which the branch instruction is acquired (which means that the instruction is fetched) from a storage source in the past. Then, the branch prediction mechanism stores a branch destination address in one way within the set by tagging still another portion of the branch source address.

Then, the branch prediction mechanism searches the storage device by using the instruction address at an instruction fetch stage. Then, if the branch destination address is stored in the storage device through the branch instruction that was already executed in the past, the branch prediction mechanism predicts that the instruction having the instruction address is the branch instruction and further predicts that a branch to the branch destination will occur.

Then, the branch prediction mechanism obtains the branch destination address from a way in which a content of the tag within the relevant set is coincident with a portion (that should be stored in the tag) of the instruction address of the now-being-fetched instruction. Thus, the branch prediction mechanism can determine in parallel with the instruction fetch whether the instruction is the branch instruction or not (whether or not the branch destination address is stored by tagging a portion of the instruction address of the branch source).

Moreover, this technique enables a computer to obtain the branch destination address predicted if the instruction is the branch instruction. Accordingly, the computer can, even when performing a pipeline process, prepare the instruction fetch at a next stage from the branch destination predicted beforehand in parallel with the present instruction fetch.

Then, if the branch destination obtained from the now-being-executed instruction is the predicted branch destination, the parallel operations at the respective stages can be conducted without stopping the pipeline process. Whereas if the branch destination obtained from the now-being-executed instruction is not the predicted branch destination, it follows that the instruction fetch from a correct branch destination resumes. If the branch destination is not stored in the storage means in the manner of being associated with the instruction address of the now-being-executed branch instruction (if the branch instruction is executed though the branch prediction is not hit) also, the branch prediction can not be utilized, and it follows that there resumes the instruction fetch from the branch destination address acquired by decoding the post-fetching branch instruction.

On the occasion of registering the branch destination address in this conventional branch prediction mechanism, for example, when the branch source address is stored in the storage device (which is referred to as "the address is hit"), a hit way number is attached together with the branch destination address to the branch instruction. Then, data existing in the way specified by the way number is updated based on a result of executing the branch instruction. Namely, for instance, if the branch prediction is correct and if there is a high possibility of similarly branching to this branch destination next, the branch prediction mechanism keeps the way information and updates management information so that the way information is retained to the longest possible degree.

Further, the address is not hit (the branch is off in prediction), and nevertheless the branch actually occurs with the result that the branch destination should be newly stored in the storage device, in which case the branch prediction mechanism stores the branch destination in the way that is predetermined by the management information and should be newly registered with the branch destination, and updates the management information so that the way information is retained as long as possible.

The present applicant already presented a proposal (refer to Patent document 1 given below) for efficiently conducting the way management (for efficiently selecting which way should be preferentially retained within the set determined from the branch source address). This technique is that each way is provided with items of information such as a 1-bit replace flag and a 1-bit valid flag, wherein the associated replace flag is updated so that a next rewriting process to the way, to which the branch destination address is newly written, is set as late as possible.

Then, if there occurs the branch destination that should be newly stored, the way in which the information should be stored next (the information on the present branch prediction destination is to be discarded) is determined from one set of present replace flags (a pattern of bits corresponding to the number of ways).

The following problem, however, is caused in a computer that fetches a plurality of instructions, e.g., four (4) instructions in one fetch operation. To be specific, there is a case where the 4 instructions contain a plurality of branch instructions, and such a necessity arises as to store each branch instruction in a storage device. This is typically a case in which, for example, the branch instruction appearing first in the 4 instructions is not executed, but the branch instruction appearing second is executed. In such a case, generally, the branch destination of the branch, which actually occurs, is registered in the storage device.

In another circumstance, e.g., in a branch prediction mechanism performing the branch prediction based on a global history (global branch history), however, there is a case of having a necessity for storing the branch destination address with no occurrence of the branch in addition to the branch destination with the actual occurrence of the branch. To give one example, if dual loops are formed by two branch instructions, according to the global history, the branch destination, which is not executed at the present, becomes a target to be stored in the storage means as the branch destination that will be executed in the future. Note that the global history was already proposed by the present applicant.

Similarly, as by a superscalar machine, in the case of simultaneously decoding and executing the plurality of instructions by providing a plurality of pipelines, there is also a possibility that the plurality of branch instructions might be retrieved at the same stage. Namely, a set generated from the instruction addresses of the plurality of branch instructions gets coincident, and such a case exists that a conflict occurs between the ways within the set.

Moreover, not even by the system of fetching the plural instructions, if the branch prediction dose not hit, there is a case in which both of the branch destination predicted from the global history and the actual branch destination should be stored.

SUMMARY

As described above, the plurality of branch destinations based on the plurality of branch instructions are stored in the storage device, and the replace flags should be managed. According to the conventional techniques, however, only one way is selected as the way in which the new branch destination can be stored next, and hence the plurality of branch destinations can not be stored in the storage device with respect to the result of one instruction fetch. Namely, in the case of newly storing the plurality of branch destinations in the storage device, the plurality of ways can not be properly selected. A further difficult problem is that in the case of selecting these plural ways, none of such a way information management technique was proposed as to retain the newly rewritten information (the branch destination addresses) on the plurality of ways over the longest possible period of time.

Accordingly, in the case of having the necessity for registering the plurality of branch destination addresses in the storage device, there is a possibility that any one piece of information might be lost. Namely, if the branch destination is not hit, or alternatively if the branch destination is mis-predicted and when the plurality of branch destinations should be registered, the information is lost, which causes a decline of performance of the branch prediction. Furthermore, this is the same with a case of having, though the branch destination is hit, the necessity for registering the plurality of branch destinations based on the global history.

The embodiment is illustrated as a branch prediction apparatus of a computer, comprising: a fetching unit fetching a plurality of instructions at a fetching stage of the computer that repeats at least the fetching stage for fetching the instructions from an instruction storage source and an execution stage for executing the instructions; a branch instruction predicting unit predicting, based on history information of the instructions executed in the past, whether an instruction executed by the computer at a next execution stage is a branch instruction or not; and an execution unit executing at least one of the fetched instructions at the execution stage, the branch instruction predicting unit including: a history storage module storing, as the history information, a branch destination address of the executed branch instruction in any one of a plurality of storage locations which is determined from an instruction address for referring to the instruction storage source; a selection module selecting the storage location by referring to selection information for selecting any one of the plurality of storage locations in such a case that the branch destination address of the executed branch instruction or the branch destination address of the branch instruction fetched at the fetching stage should be stored as the history information; a storage control module storing the branch destination address in the selected storage location; and an update module updating the selection information corresponding to the storage into the storage location, wherein the selection module, if there is a plurality of branch destination addresses that should be stored in the storage locations and when the first branch destination address is stored in the storage location, selects the storage location for the second branch destination address according to the selection information after being updated by the update module.

According to the branch prediction apparatus, the second branch destination address is selected based on the selection information after the update means has performed updating on the occasion of storing the first branch destination address in the storage location, and therefore the branch destination addresses can be stored according to the selection information in the case of having the necessity for registering the plurality of branch destination addresses at one execution cycle. Note that a phrase "processing the instruction" connotes execution of a predetermined process based on the instruction and embraces, e.g., in the case of a conditional branch instruction, a process of branching or not branching to the branch destination based on determination of a condition and a result of the determination.

The selection information may contain 1-bit write sequence information, with respect to the plurality of storage locations, for specifying a write sequence to the plurality of storage locations determined by the instruction address, and the selection module may select the storage location of the branch destination address according to the write sequence information. According to the branch prediction apparatus, each of the plural storage locations can be selected based on the 1-bit write sequence information.

The history storage module may search the plurality of storage locations for the branch destination address if the instruction is the branch instruction on the basis of the instruction address of the instruction in the process of being fetched at the instruction fetching stage, and the selection module, if there is the plurality of branch addresses that should be stored in the storage locations and if the first branch destination address is an address retrieved from any one of the storage locations by the history storage module, may set the storage location stored with the first branch destination address as the first storage location, and may select the second storage location based on the selection information.

According to the branch prediction apparatus, in the case of having the necessity for storing the plurality of branch destination addresses, if the branch address has already been retrieved from any one of the storage locations, this storage location is set as the first storage location, and further the second storage location can be selected based on the selection information.

The selection module, if there is the plurality of branch addresses that should be stored in the storage locations and if the first branch destination address is not an address retrieved from any one of the storage locations by the history storage module, may select the first storage location based on the selection information, then update the selection information, and select the second storage location based on the updated selection information.

According to the branch prediction apparatus, in the case of having the necessity for storing the plurality of branch destination addresses, if the branch address was not already retrieved from any one of the storage locations, the first storage location is selected based on the selection information, and, after updating the selection information along with this selection, the second storage location can be selected. Accordingly, the plurality of branch destination addresses can be stored in the proper storage locations.

The selection information may contain flag information showing whether a storage content of each of the plurality of storage locations is valid or invalid, and the selection module may preferentially select the storage location of which the storage content is shown to be invalid by the flag information. The storage locations can be managed by preferentially selecting the storage location of which the storage content is invalid.

According to the branch prediction apparatus, in the case of having the necessity for registering the plurality of branch destination addresses in the storage device, the performance of the branch prediction can be restrained from declining without any information missing.

BRIEF DESCRIPTION OF THE DRAWINGS

FIG. 5 is an explanatory diagram illustrating logic for selecting the way based on a replace flag;

FIG. 6 is a diagram illustrating logic for determining whether the replace flag is inverted or not when an invalid way is selected;

FIG. 8 is a diagram illustrating an occurrence pattern of the branch prediction if two branch instructions exist in instructions fetched on a 16-bytes basis;

FIG. 9 is a diagram illustrating combination patterns of results of executing the branch instructions and results of the branch predictions of next branch instructions;

FIG. 10 is a diagram illustrating combination patterns of results of executing the branch instructions and results of the next predictions if the two branch instructions exist and when the first branch instruction is hit;

FIG. 11 is a diagram illustrating combination patterns of results of executing the branch instructions and results of the next predictions if the two branch instructions exist and when the second branch instruction is hit;

FIG. 12 is a diagram illustrating combination patterns of the execution results and the next predictions if the branch is not predicted;

DETAILED DESCRIPTION

A processor according to an embodiments will hereinafter be described with reference to the drawings.

<<First Embodiment>>

A processor according to a first embodiment will hereinafter be described with reference to the drawings in FIGS. 1 through 7.

Figure 1:
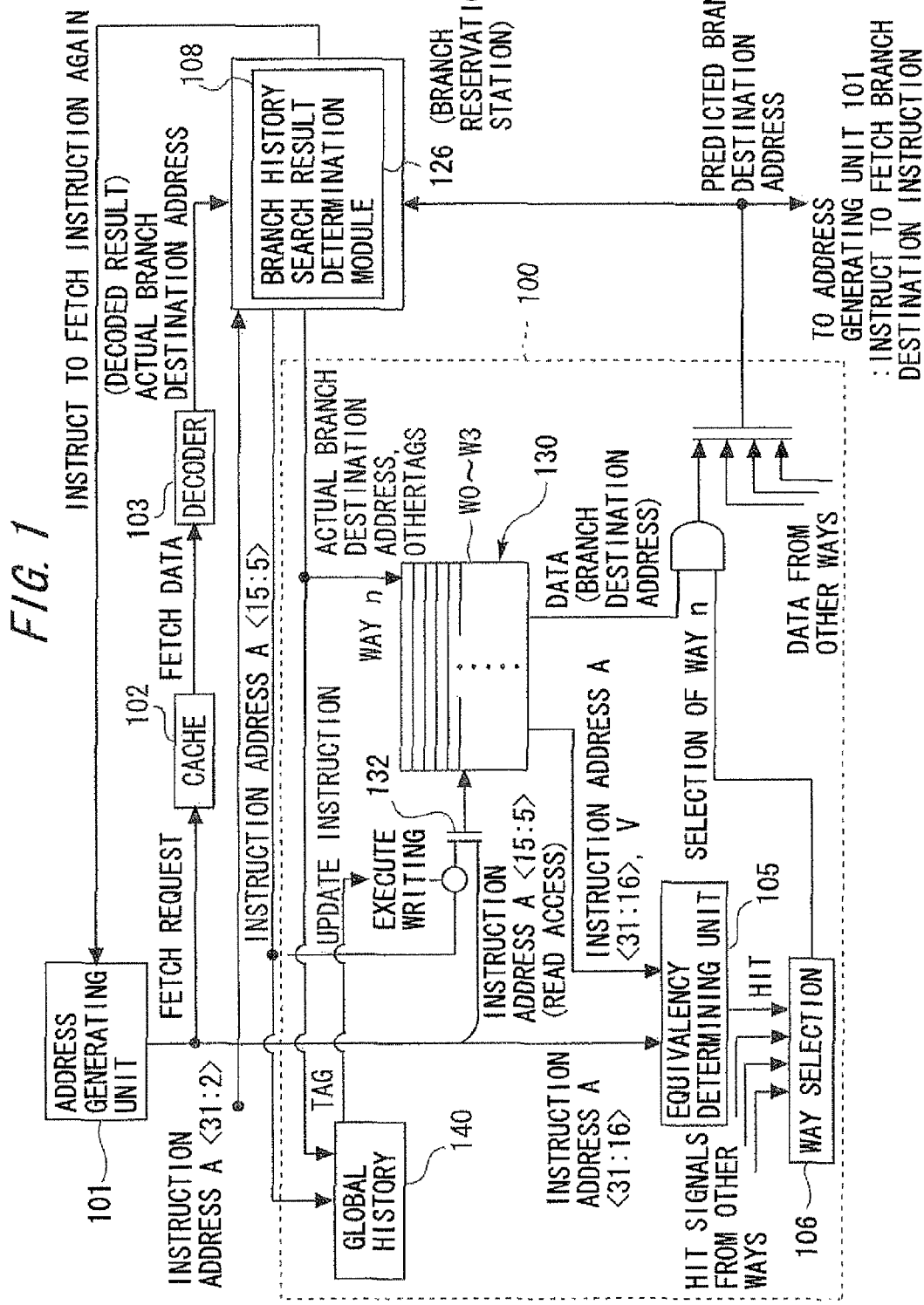
FIG. 1 is an explanatory diagram (part 1) illustrating an outline of a configuration of a branch prediction apparatus in a 4-way set associative system that is included in the present processor.
Figure 2:
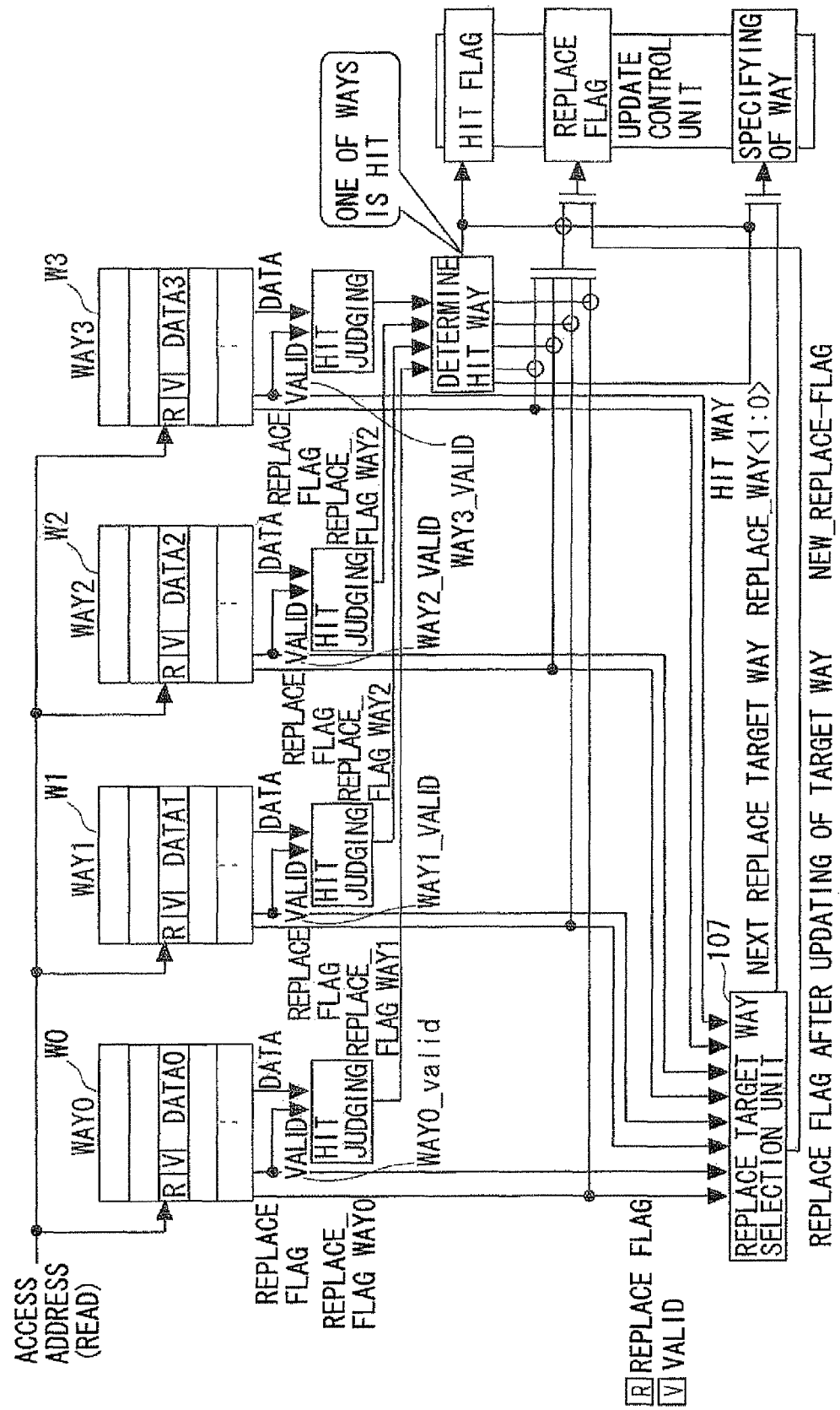
FIG. 2 is an explanatory diagram (part 2) illustrating the outline of the configuration of the branch prediction apparatus in a 4-way set associative system that is included in the present processor.
Figure 7:
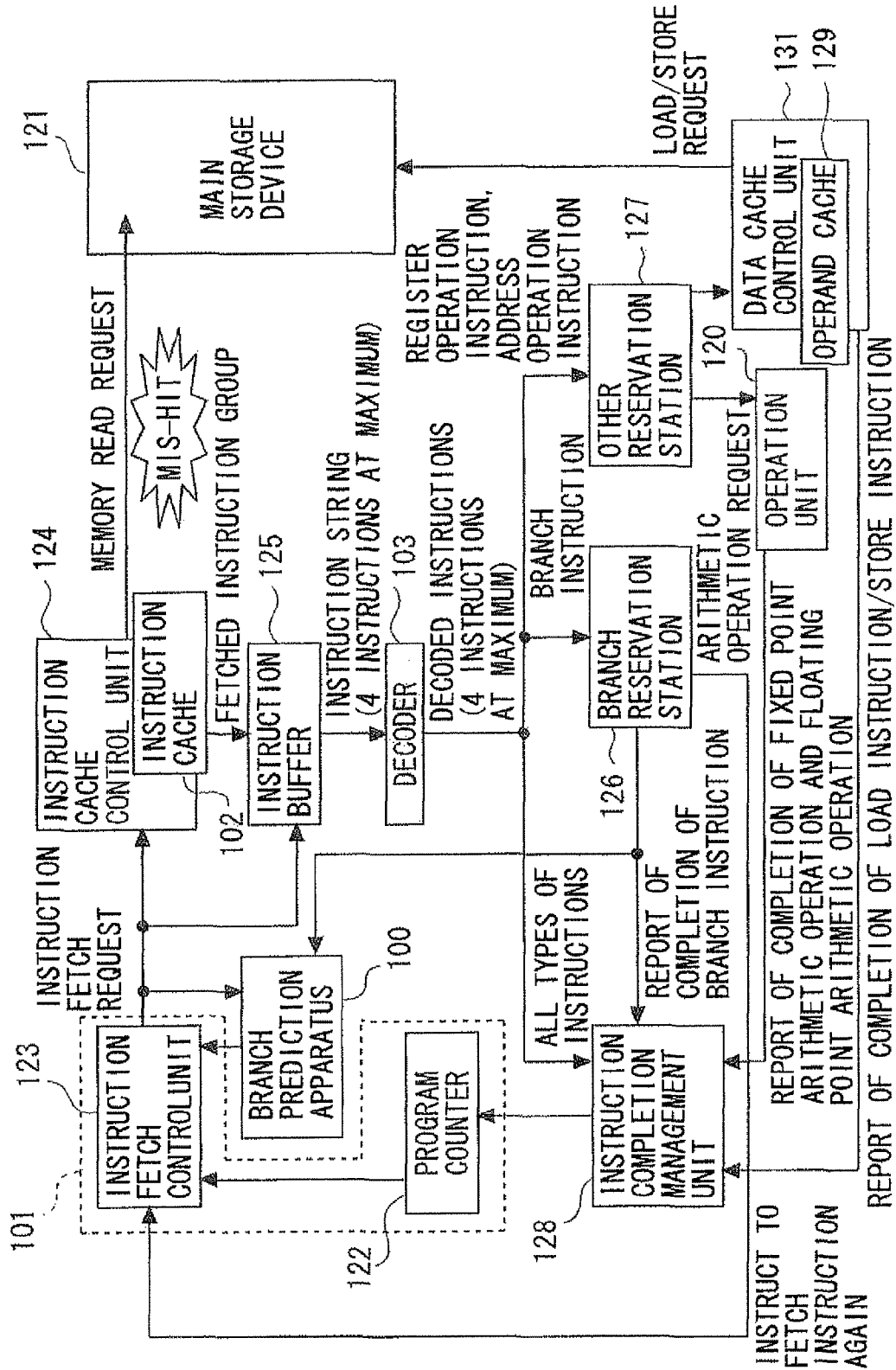
FIG. 7 is a diagram illustrating a system architecture of the processor including the branch prediction apparatus.

FIGS. 1 and 2 are explanatory diagrams each illustrating an outline of a configuration of a branch prediction apparatus 100 based on a 4-way set associative system held by the present processor. Further, FIG. 7 is a diagram illustrating a system architecture of the processor incorporating the branch prediction apparatus 100 shown in FIGS. 1 and 2.

As illustrated in FIGS. 1 and 2, the branch prediction apparatus 100 includes mainly a branch history storage device 130 having four ways W0 through W3, an address generating unit 101, a cache memory 102, a decoder 103 an equivalency determining unit 105, a hit-way selection module 106, a replacement target way selection module 107, a branch history search result determination unit 108 and a global (branch) history (GBH) 140. These components are connected to each other via a bus etc.

Figure 3:
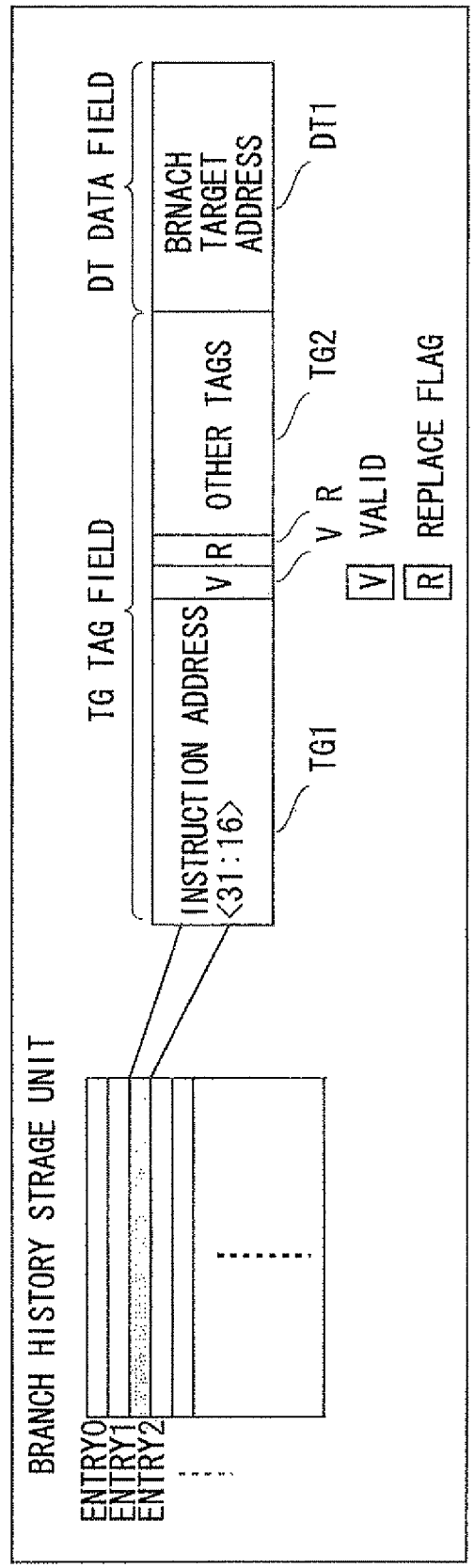
FIG. 3 is an explanatory diagram illustrating a structure of each of ways organizing a set in a branch history storage device.

FIG. 3 is an explanatory diagram illustrating a structure of each of the ways organizing a set in the branch history storage device 130. The branch history storage device 130 is a comparatively fast accessible storage device such as a SRAM (Static Random Access Memory). The 4-way branch history storage device 130 has entries associated with 4 ways within one set. As illustrated in FIG. 3, each entry includes a tag field TG and a data field DT. The tag field TG is structured by (a part of) an instruction address TG1, a valid flag V, a replace flag R and other flag TG2. The data field DT is structured by a branch destination address DT1 defined as predetermined data.

One set is determined by a portion (e.g., <15:5>) of the instruction address A output from the address generating unit 101. The first embodiment adopts the 4-way scheme, and hence it follows that the determination of the set leads to designation of 4 entries. Further, one of the 4 entries is determined by a portion (e.g., <31:16>) of the instruction address A. The determination of this one entry involves storing the portion (e.g., <31:16>) of the instruction address A in the instruction address TG1. For example, when registered, the set is determined by use of a portion <15:5> of the instruction address A, and the remaining portions are stored as data in the tag field (containing the instruction address TG1) of any one of the entries (any one of the 4 entries associated with the 4 ways) within the set. Note that the description of the instruction address <31:16> represents that the instruction address TG1 occupies the 31st bit through the 16th bit, which bits are a portion of the instruction address (e.g., 32 bits).

The valid flag is a flag showing whether the entry is valid or invalid. For example, if the valid flag is "1", this indicates that the entry containing this valid flag is valid. If the valid flag is "0", this indicates that the entry containing this valid flag is invalid. An implication of the entry being valid is that the branch destination address defined as the data registered in the way is not deleted. The valid flag is employed also for selecting the replacement target way.

The replace flag is a flag used for selecting the replacement target way. The branch destination address is stored with a branch destination address of a branch instruction fetched from the cache memory 102 (or the main storage device).

The address generating unit 101 serves to generate and output the instruction address A etc. The address generating unit 101 includes a program counter etc. The cache memory 102 is a comparatively fast accessible storage device such as the SRAM. The decoder 103 serves to decode the branch instruction etc fetched from the cache memory 102 (or the main storage device).

The equivalency determining unit 105 compares (the portion of) the instruction address A output from the address generating unit 101 with the instruction address TG1 of the tag field TG and, if the coincident instruction address TG1 exists, outputs a hit signal (which is a bit showing the hit). The hit way selection module 106 outputs a hit way selection signal for designating the hit way based on the hit signal from each way.

The branch history search result determining unit 108 determines whether or not the branch destination address obtained from the branch prediction apparatus is coincident with the branch destination of the branch instruction fetched from the memory area (the cache memory 102 or the main storage device), i.e., determines whether the prediction is correct or not.

Figure 4:
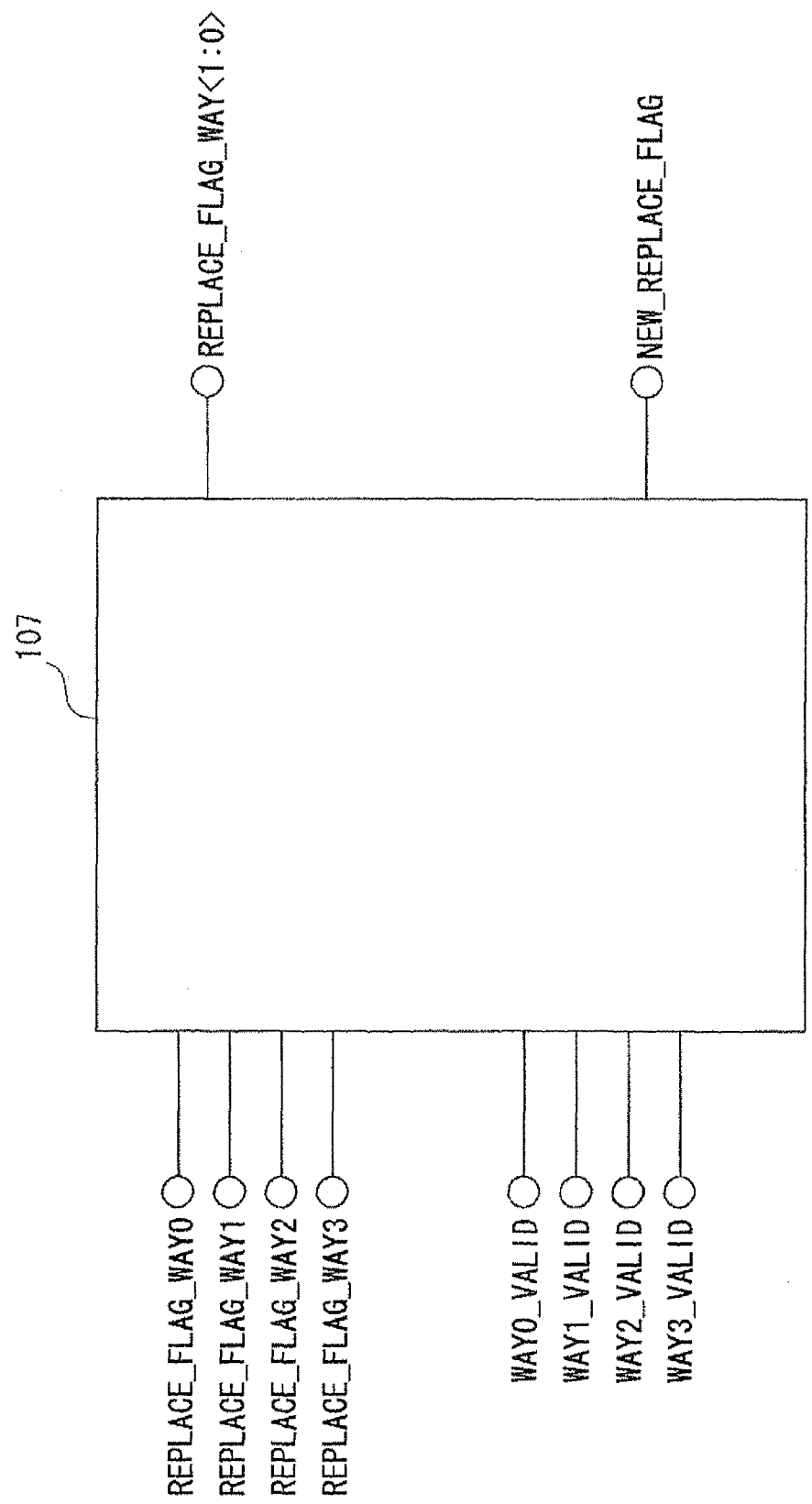
FIG. 4 is a diagram illustrating an outline of a configuration of a replacement target way selection module.

The replacement target way selection module 107 selects mainly the replacement target way. FIG. 4 illustrates an outline of a configuration of the replacement target way selection module 107. The replacement target way selection module 107 acquires replace flags R (replace_flag_way0, replace_flag_way1, replace_flag_way2, replace_flag_way3) and valid flags (way0 valid, way1_valid, way2_valid, way3_valid) contained in the entries designated by the same address A from the individual ways way0 (W0) through way3 (W3). The replacement target way selection module 107 finally outputs a replace flag (new_replace_flag) written to the way designated by a replacement target way selection signal (replace_way<1:0>) for designating the replacement target way and by a selection signal thereof.

The replacement target way selection module 107 selects the replacement target way on the basis of the replace flags acquired from the individual ways W0 through W3. FIG. 5 is an explanatory diagram showing logic by which the ways are selected based on those replace flags. FIG. 5 shows that when the left-sided replace flags (e.g., (way0, way1, way2, way3)= (0, 0, 0, 0)) are acquired from the ways way0 through way3, the right-sided way (e.g., way0) marked with a circle mark is selected as the replacement target way.

For example, in FIG. 5, consideration is given to a case in which the replace flags are (0, 0, 0, 0). In this case, referring to FIG. 5, way0 is selected as the replacement target way. Further, the replace flag of the selected way is inverted, and hence the replace flags become (1, 0, 0, 0) in this case.

Then, when the replace flags are (1, 0, 0, 0), referring to FIG. 5, way1 is selected as the replacement target way. Then, the replace flags become (1, 1, 0, 0).

Further, when the replace flags are (1, 1, 0, 0), referring to FIG. 5, way2 is selected as the replacement target way. Then, the replace flags become (1, 1, 1, 0).

Still further, when the replace flags are (1, 1, 1, 0), referring to FIG. 5, way3 is chosen as the replacement target way. Then, the replace flags become (1, 1, 1, 1).

Yet further, when the replace flags are (1, 1, 1, 1), referring to FIG. 5, way0 is selected as the replacement target way. Then, the replace flags become (0, 1, 1, 1).

Thus, according to the table in FIG. 5, when selecting the way and inverting the replace flag, efficiency approximate to a value obtained by the LRU (Least Recently Used) algorithm can be attained in a way that delays timing to the greatest possible degree when the selected way will be chosen next.

For example, when simply transiting among rows from the uppermost row (0, 0, 0, 0) to the 8th row (0, 0, 0, 1) in the table in FIG. 5, the timing when the selected way will be chosen next is invariably the last (the 4th). Further, when transiting among rows from the 9th row (1, 0, 1, 0) to the lowermost row (1, 0, 1, 1), the timing when the selected way will be chosen next is invariably the last (the 4th).

The replacement target way selection module 107, if all of the flags acquired from the respective ways W0 through W3 are valid, outputs the replacement target way selection signal (replace_way<1:0>) for designating the way (which is determined from the relation in FIG. 5) selected based on the replace flag.

Moreover, the replacement target way selection module 107 selects the replacement target way on the basis of the valid flags acquired from the individual ways way0 through way3, Namely, the replacement target way selection module 107, if at least one of the valid flags acquired from the respective ways is invalid, outputs the replacement target way selection signal (replace_way<1:0>) for designating the way (containing the invalid entry) selected based on the valid flags.

Furthermore, the replacement target way selection module 107 outputs the replace flag (new_replace flag) that is written to the way designated by the replacement target way selection signal (replace_way<1:0>). Specifically, the replacement target way selection module 107, if all of the valid flags acquired from the individual ways way0 through way3 are valid, outputs the replace flag (new_replace_flag) which is generated by inverting the replace flag obtained from the way designated by the replacement target way selection signal (replace_way<1:0>). On the other hand, the replacement target way selection module 107, if at least one of the valid flags acquired from the respective ways way0 through way3 is invalid, outputs the replace flag (new_replace_flag) according to the table in FIG. 6.

The respective rows in FIG. 6 are uniquely distinguished from each other based on a set of left-sided replace flags (way0, way1, way2, way3). Each row represents statuses of the replace flags of the individual ways at the present. Further, a set of ways (way0, way1, way2, way3) on the right side in the table correspond to positions of the invalid ways. Thus, in the right-sided areas of the respective rows, the inverted status and non-inverted status are designated in the entries in the table, which correspond to the invalid positions.

Now, an assumption is that the set of left-sided replace flags (e.g., (way0, way1, way2, way3) (0, 0, 0, 0)) are acquired from the individual ways way0 through way3 and that any one (e.g., the way way0) of the ways in the right-sided areas is designated as the way containing the invalid entry by the replacement target way selection signal (replace_way<1:0>). Then, in the row designated by the value set (0, 0, 0, 0) in the left-sided area in the table, the "inversion" is designated in the position of way0 in the right-sided area in the table. Accordingly, the replace flag acquired from the way0 designated by the selection signal is inverted in this case and is output as the replace flag (new_replace_flag).

Further, for instance, the position of way2 in the same row is blanked with no designation of the "inversion". In this case, the replace flag is output in an intact form as the replace flag (new_replace_flag) without being inverted.

For example, when way0 is selected based on the valid flags in the status of (0, 0, 0, 0), the inversion is designated in FIG. 6, and therefore the replace flag becomes (1, 0, 0, 0). In this case, according to the table in FIG. 5, the timing when way0 is to be selected next is the latest (the 4th).

Moreover, for instance, when way1 is selected based on the valid flags in the status of (0, 0, 0, 0), the inversion is designated in FIG. 6, and hence the replace flag becomes (0, 1, 0, 0). In this case, according to the table in FIG. 5, the timing when way1 will be selected next is posterior to a transition such as the 12th row (0, 1, 0, 0)→the 13th row (0, 1, 0, 1)→the 14th row (1, 1, 0, 1). In this case, it follows that way1 is selected at the third transition that is one before the fourth latest transition.

These status transitions in FIGS. 5 and 6 can be realized by a logic gate. For example, Japanese Patent Laid-Open Publication No. 2004-38298, which has already been filed by the present applicant, discloses a logic circuit that realizes the relations between the replace flags and the outputs in FIGS. 5 and 6.

The global history 140 includes a storage module stored with a history of a branch direction for every branch instruction executed in the past, and manages the branch prediction from a result of the plurality of branches performed in the past. Namely, the prediction about whether or not a prospective branch will be conducted according to the branch instruction, is made based on regularity of the histories of the plurality of branches performed in the past.

Further, the global history 140 is stored with, e.g., a recent consecutive branch establishment count and a recent consecutive branch non-establishment count per branch instruction. Then, supposing that the branch is established at the present, the prediction is that the branch will be established (the branch will be conducted) also next if the present consecutive branch establishment count does not exceed the consecutive branch establishment count of the last time, and the prediction is that the branch will not be established (the branch will not be conducted) next if the present consecutive branch establishment count gets coincident with the consecutive branch establishment count of the last time. Further, supposing that the branch is not established at the present, the prediction is that the branch will not be established (the branch will not be conducted) also next if the present consecutive branch non-establishment count does not exceed the consecutive branch non-establishment count of the last time, and the prediction is that the branch will be established (the branch will be conducted) next if the present consecutive branch non-establishment count gets coincident with the consecutive branch non-establishment count of the last time.

The global history 140 in the first embodiment sends the branch prediction based on the global branch histories to the branch history storage device 130 and gives the device 130 an instruction about whether the branch instruction is required to be registered in the way or not. The branch history storage device 130, after the branch destination address has been established by executing the branch instruction, stores the branch destination address in a candidate way attached to each branch instruction in accordance with the instruction given from the global history 140.

FIG. 7 is a diagram of a system architecture of the processor including the branch prediction apparatus described above. The present processor is a so-called program-preinstalled type of computer that reads and executes the instructions stored in the main storage device 121.

As in FIG. 7, the processor includes an operation unit 120 which executes the instructions, a main storage device 121 stored with the instructions executed by the operation unit 120 and data etc that is processed by the operation unit 120, and a program counter 122 that designates an address, on the main storage device 121, of the instruction that should be executed by the operation unit 120. Control of the processor based on the control of this type of program counter 122 is widely known.

In FIG. 7, the processor includes, more specifically, an instruction fetch control unit 123 that controls an instruction fetch based on the address generated by the program counter 122, an instruction cache control unit 124 which manages the instruction cache 102 and fetches the instruction in response to an instruction fetch request given from the instruction fetch control unit 123, an instruction buffer 125 that retains the instruction fetched from the instruction cache 102, the decoder 103 that decodes the instruction in the instruction buffer 125, reservation units (including a branch reservation unit 126 which controls the execution of the branch instruction and other reservation unit 127 which controls execution of a register operation instruction and execution of an address operation instruction) which control timing of executing the decoded instructions, an instruction completion management unit 128 that monitors completion of the execution of the instruction, an operand cache 129 which supplies fast the operation unit 120 with an operand of the instruction executed by the operation unit 120, and a data cache control unit 131 which manages how the data is transferred and received between the main storage device 121 and the operand cache 129.

Among those components, the instruction fetch control unit 123 corresponds to the address generating unit 101 in FIG. 1. The following discussion will deal with a control procedure of the present processor. To begin with, the program counter 122 sends the instruction address (which is the address on the main storage device 121 stored with the instruction) to the instruction fetch control unit 123.

The instruction fetch control unit 123 instructs the instruction cache control unit 124 to fetch the instruction specified by the instruction address, and also instructs the branch prediction apparatus 100 to predict the branch. Then, in parallel with the instruction fetch process in the instruction cache 102, a search through the branch history storage device 130 of the branch prediction apparatus 100 is made.

Then, the branch prediction apparatus 100, when the branch instruction is hit with the present instruction address, sends the branch destination address to the instruction fetch control unit 123. At this time, the branch prediction apparatus 100 sends, together with the branch destination address, a way number and a value of the replace flag with respect to the hit way (which will hereinafter be referred to as way information) to the instruction fetch control unit 123.

The instruction fetch control unit 123 further instructs, based on the branch destination address of the branch instruction hit by the branch prediction apparatus 100, the instruction cache control unit 124 to fetch a next instruction (this type of process normally organizes a stage of a pipeline). Note that if the branch prediction is not hit, a next instruction address with no branch is generated within the instruction fetch control unit 123, and the instruction cache control unit 124 is instructed to fetch the next instruction.

Then, the instruction fetch control unit 123 refers to the instruction buffer 125 with respect to a group of instructions fetched from the instruction cache control unit 124. Subsequently, the instruction fetch control unit 123 attaches, if hit, the hit way information to the branch instruction in the instruction buffer 125. And if not hit, the instruction fetch control unit 123 also attaches to a branch instruction in the instruction buffer 125, information on the way in which the branch instruction should be next stored, according to the logic shown in the tables in FIGS. 5 and 6. Each of the instructions attached with the way information is sent to the decoder 103.

As a result, the instruction is decoded and sent to the branch reservation station 126, the other reservation station 127 and the instruction completion management unit 128. Note that even after the instruction has been decoded, the way information is retained together with the branch instruction in the branch reservation station 126. The decoded instruction waits in an execution standby status on the basis of the processing of the operand by the other reservation station 127. Then, just when coming to a complete set of operands, the respective instructions are executed by the operation unit 120 or the data cache control unit 131.

On the other hand, the branch reservation station 126 queues the branch instructions. Then, the branch reservation station 126 queues the branch instructions. Then, the branch reservation station 126 determines whether or not the branch is done by executing the branch instruction and, when the branch destination address is determined if the branch is done, sends a report of completion to the instruction completion management unit 128 and the branch prediction apparatus 100. At this time, the instruction address of the branch instruction, the branch destination address and the should-be-stored way information (the way number and the replace flag) are sent to the branch prediction apparatus 100.

At this time, the search result determination unit 108 (see FIG. 1) in the branch reservation station 126 determines whether the branch prediction is correct or not. To be specific, in a case (a1) where the branch prediction is hit with the instruction address by the branch prediction apparatus 100 (the branch destination address is stored in the branch history storage device 130) and in a case (a2) where the fetched branch instruction branches to the branch destination address, the branch prediction proves to be correct. Alternatively, in a case (b1) where the branch prediction is not hit with the instruction address by the branch prediction apparatus 100 and in a case (b2) where the fetched instruction is not the branch instruction or if not branched even when being the branch instruction, the branch prediction proves to be correct.

In this case, it follows that the instruction fetch, which has already been requested of the cache control unit 124, continues as it is.

Further, if the branch prediction is incorrect, it follows that the instruction fetch, which has already been requested of the cache control unit 124, and a series of processes subsequent thereto are interrupted. Simultaneously, the branch reservation station 126 instructs the instruction fetch control unit 123 to fetch again the instruction from the correct branch destination.

The global history 140 determines based on the result of executing the branch instruction described above whether to be registered in the branch history storage device 130 of the branch prediction apparatus 100. Then, the global history 140 sends an entry update instruction to the branch history storage device 130.

The branch prediction apparatus 100 stores, based on the update instruction given from the global history 140, the branch instruction executed via a selector 132 in the way. The way, in which the branch instruction is stored at this time, is the way specified by the way number attached to each instruction in the instruction buffer 125 by the branch prediction apparatus 100. Furthermore, along with storing the branch instruction in the way, the replace flag attached likewise to the instruction is stored.

As discussed above, according to the processor in the first embodiment, a chance of becoming the replacement target way is cycled in sequence according to the rules in FIGS. 5 and 6. Namely, the most recently registered way is to be selected as the replacement target way as late as possible. The replacing chance comes around earlier by one than the latest case depending on the combinations, however, the control such as "the replacement chance comes around latest." or "the replacement chance comes around in the order earlier by one than the latest order (e.g., at the third rewrite timing in the case of the 4 ways)." is realized with all of the combinations, and the mechanism operates, though not the complete LRU algorithm, in a state close to the complete LRU algorithm.

Namely, according to the branch prediction apparatus 100 in the first embodiment, the 1-bit replace flag is prepared for every way, the replacement of the entry is controlled based on the replace flag and the valid flag in accordance with the rules, and further, the replacement of the entry of the branch history storage device 130 is realized with the operation close to the LRU algorithm. The information needed for attaining this scheme is only the 1-bit flag for every way. Moreover, when outputting the information thereof to the outside, the information undergoes further 1-bit compression. This implies that the cost is reduced to a much greater degree than by a technique like the conventional LRU algorithm.

<<Second Embodiment>>

The processor according to a second embodiment will hereinafter be described with reference to the drawings in FIGS. 8 through 14. The first embodiment has exemplified the processing by the branch prediction apparatus 100 performing the control so that the newly written way is rewritten as late as possible on the basis of the tables shown FIGS. 5 and 6. The second embodiment will exemplify a processor that manages the ways in the same way as in the first embodiment in such a type of processor that a plurality of instructions is fetched at the same fetch stage. Other configurations and operations in the second embodiment are the same as those in the first embodiment. Such being the case, the same components are marked with the same numerals and symbols, and their explanations are omitted. Further, the discussion will refer to the drawings in FIGS. 1 through 7 as the necessity may arise.

In the second embodiment, the processor executes the instructions each consisting of 4 bytes. Further, the processor fetches the 16-bytes instructions, i.e., the 4 instructions at a single instruction fetch stage (this type of process is referred to as a "simultaneous fetch" in the second embodiment).

The 4 instructions are fetched with the same instruction address and therefore share the 4 ways within the same set (which is also called a line) with each other. Then, if it is predicted that the fetched branch instruction will be fetched by the instruction fetch of the next time and then executed, the branch prediction apparatus 100 stores a branch destination address of this branch instruction in any one of the ways. In this case, the branch prediction apparatus 100 determines one set that shares the 4 ways of the built-in branch history storage device 130 from a portion of a branch source address of the branch instruction. Then, the way, which should be rewritten, is determined from the 4 ways within this set.

To be specific, the 1-bit replace flag and valid flag are attached to each of the ways within the set, and the way, which should be rewritten next, is determined based on the present statuses of the replace flag and of the valid flag. Then, the branch prediction apparatus 100 writes a tag (containing the portion of the branch source address and a bit of a portion that is not used for determining the set) in the entry associated with the way, and also writes the branch destination address in the way. Moreover, the branch prediction apparatus 100 sets (inverts or does not invert) the status of the replace flag according to the present status of the replace flag. This setting is, in the same way as in the first embodiment, based on the predetermined rule that the timing at which the now-rewritten way will hereafter be rewritten can not completely be set latest but is set as late as possible (in the latest order or the order earlier by one than the latest order).

According to an instruction set architecture assumed in the second embodiment, a plausible hypothesis is that the simultaneously-fetched 4 instructions contain only the 2 branch instructions at the most in the normal operation. Accordingly, the number of the branch instructions sharing the set (which is also called a line) is presumed to be "2" at the maximum corresponding to the instruction addresses with which the plurality of instructions is fetched at the same fetch stage. Namely, it is presumed based on the branch prediction and the result of executing the instruction that the number of the branch instructions, which should be registered by the branch prediction means at the same timing (the same stage), is "2" at the maximum.

In the execution of those instructions, the processing by the branch prediction apparatus 100 is outlined as follows:

(1) If the branch instruction is hit by a search through the branch history storage device 130 on the basis of the instruction address of the now-being-fetched instruction, the branch prediction apparatus 100 utilizes the hit way information for updating the replace flag.

Furthermore, if there exists the branch instruction predicted to make a branch from the prediction of the global history 140 in the non-hit branch instructions of the fetched 4 instructions, a new way is selected based on the rule shown in FIG. 5 from the present status of the replace flag.

At this time, if the existence of the invalid way is known from the valid flag, the branch prediction apparatus 100 preferentially selects the invalid way and determines, based on the table in FIG. 6, whether the replace flag is inverted or not. Then, the branch prediction apparatus 100 stores, according to the instruction of the global history 140, the branch destination address of the non-hit branch instruction in the way, and updates the replace flag.

(2) If the branch instruction is not hit by the search through the branch history storage device 130 on the basis of the instruction address of the now-being-fetched instruction, and if the two instructions (which are called a first candidate instruction and a second candidate instruction) should be stored in the branch history storage device 130, the branch prediction apparatus 100, at first, determines the way in which the first candidate instruction should be stored from the present replace flag and the valid flag, and temporarily rewrites the replace flag. Next, the way, in which the second candidate instruction should be stored, is determined from a combination of the replace flags in a temporarily rewritten status through the selection of the first candidate instruction and from the valid flag, and the replace flag is further temporarily rewritten. Then, finally whether the actual storage is done or not is determined based on the instruction of the global history 140, and the replace flag is rewritten.

<Outline of Processing by Branch Prediction Apparatus 100>

The branch prediction apparatus 100 executes the branch prediction by use of the branch history registered in the branch history storage device 130 on the occasion of fetching the instructions. As described above, the instructions are fetched on the 16-bytes (4 instructions) basis. Accordingly, it follows that the branch prediction apparatus 100 searches for the branch instructions contained in the 16 bytes. The branch prediction apparatus 100 accesses the branch history storage device 130 by using a portion of the instruction address, and acquires the data for the 4 ways. These pieces of data contain the replace flag and the valid flag.

The branch history storage device 130 is stored with the branch instructions that branch off. The branch prediction apparatus 100, when searching through the branch history storage device 130, compares each of the 4 entries (stored with the tags) associated with the 4 ways of the relevant set with a portion of the instruction address (which is a bit field that should become the tag). Then, at a point of time when the entry tag gets coincident with the bit field (just when the branch instruction is hit in the branch history storage device 130), the branch prediction apparatus 100 infers that the instruction will branch to the branch destination.

Accordingly, even when the branch is not predicted, there are some cases in which the fetched 4 instructions contain the branch instruction that should be newly registered in the branch history storage device 130.

A first case is that the branch instruction acting not to branch exists in the 4 instructions. In this case, even when the branch instruction does not branch in the present process (stage), the global history 140 might predict that this instruction will branch next time, and an instruction for registration might be given. A second case is that the branch is mis-predicted. This is the case in which the branch prediction apparatus 100 mis-predicts the branch, as a result of which the branch history storage device 130 does not hit itself, and the branch instruction in the fetched 4 instructions branches. In this case, the branch prediction apparatus 100 unconditionally registers the branch instruction, which has branched without the branch prediction, as a "branch instruction that will branch" next, i.e., the branch prediction apparatus 100 stores the tag and the branch destination address in the entry in accordance with the way information that is predetermined by the replace flag and is attached to the instruction.

FIG. 8 illustrates an occurrence pattern of the branch prediction if the two branch instructions exist in the instructions fetched on the 16-bytes basis. In the two branch instructions, for example, if the first branch instruction branches, as a matter of course, the second branch instruction is not executed. In the second embodiment, the branch prediction apparatus 100, just when the first branch instruction in the 16 bytes is hit, operates according to a determination that a prediction of a further branch instruction is not required.

FIG. 9 shows combination patterns of results of executing the branch instructions and results of the branch predictions of the next branch instructions. In FIG. 9, "Tk" represents "Branched (Taken)", and "N_tk" represents "Not Branched (Not Taken)". As shown in FIG. 9, a case that the fetched 2 branch instructions become processing target instructions of the branch prediction apparatus 100 occurs when the first branch instruction is not branched (not taken). The cases (1-1), (1-2) and (2) in FIG. 8 will hereinafter be described respectively in conjunction with FIGS. 9 through 12, (1-1): It is assumed that at the present fetch stage, the fetched 16 bytes contain the two branch instructions, and the first branch instruction is hit. FIG. 10 shows combination patterns of results of executing the second branch instructions and results of the next predictions in this case. In this instance, the first branch instruction is registered in the hit way, and hence a problem is how the non-hit second branch instruction is processed.

In FIG. 10, a pattern 7 shows that the first branch instruction is hit and is branched (taken). The branch prediction apparatus 100 according to the second embodiment temporarily sends, to the instruction fetch control unit 123, the way information to be rewritten when searching for the branch history, and stores the branch destination address in the way on the basis of the way information sent back from the branch reservation station 126 after decoding and executing the instruction. Therefore, when branched by the first branch instruction, a chance of storing the second branch instruction in the way disappears at this point of time.

Further, in FIG. 10, the execution result shows "N_Tk" in spite of "being hit", which represents that the branch is mis-predicted.

In the case of FIG. 10, the registering operation of the second branch instruction occurs in the patterns 2, 3, 5 and 6. Among these patterns, the patterns 2 and 3 show a case in which the first branch instruction is "N_Tk" in the "next prediction". Thus, those are cases in which rewriting the way is permitted even in the case that the first branch instruction is hit in the current execution result.

On the other hand, with respect to the patterns 5 and 6, "Tk" is given in the "next prediction" of the first branch instruction, and hence it follows in terms of the prediction that the execution priority is given to the first branch instruction. Therefore, this is a case that the way in which the first branch instruction is hit in the current execution result is not desired to be rewritten by the second branch instruction. A scheme in this case entails restraining the second branch instruction from being registered or preparing a different way (the way within the same set) for registering the second branch instruction.

(1-2): Next, an assumption is that the fetched 16 bytes contain the two branch instructions, and the second branch instruction is hit. FIG. 11 shows combination patterns of results of executing the second branch instructions and results of the next predictions in this case. In this instance, the second branch instruction is registered in the hit way, and hence a problem is how the non-hit first branch instruction is processed.

In FIG. 11, the pattern 7 shows a case in which the first branch instruction is, though not hit, branched (taken). In this case, the second branch instruction is not executed. Further, in FIG. 11 also, the execution result shows "N_Tk" in spite of "being hit", which represents that the branch is mis-predicted.

In FIG. 11, the patterns 4 through 7 need registering the first branch instruction. Among these patterns, with respect to the patterns 5 and 6, if there is only the way information of the second branch instruction that has been hit, and if the first branch instruction is registered in the hit way, it follows that the first branch instruction is, even though temporarily registered, immediately overwritten by reregistering the second branch instruction.

Moreover, in regard to the pattern 4, the second branch instruction is, though hit this time (though predicted to be branched (taken), predicted not to be branched next, as a result of which an entry erasing operation occurs. Namely, in this case, if there is only the way information of the second branch instruction that has been hit and if the first branch instruction is registered in the hit way, it follows that the first branch instruction, which has been registered with an effort, is erased by the erasing operation of the second branch instruction.

Avoidance of these problems entails registering the branch destination address in a location different from the hit way with respect to the first non-hit branch instruction in the patterns 5, 6 in FIG. 10 and in the patterns 4-6 in FIG. 11. It is considered that this scheme involves using the way determined by the replace flag.

Namely, if the 4 instructions fetched by the instruction fetch includes the branch instruction which is hit in a way, the branch instruction hit is set so as to use the hit way as it is. To be specific, the branch prediction apparatus 100 attaches the hit way information to the hit branch instruction and thus sends the information-attached branch instruction to the decoder 103.

Moreover, the branch instruction, which is, though not hit, contained in the fetched 4 instructions and predicted to be branched (taken) next, is set so as to use the way selected based on the replace flag. Specifically, the branch prediction apparatus 100 attaches the information on the way selected based on the replace flag and the valid flag to the non-hit branch instruction and thus sends the information-attached branch instruction to the decoder 103.

Further, the branch prediction apparatus 100 updates the way information (the replace flag, the valid flag, etc) and the stored contents according to the result of decoding and executing the 4 instructions. To be specific, the branch prediction apparatus 100, based on the prediction of the global history 140, registers the branch destination address for the next branch prediction in the way, changes the replace flag and changes the valid flag of the hit way.

For example, the decoded 4 instructions contain the 2 branch instructions, and it is considered that the latter branch instruction is hit. An assumption in this case is that a content of the prediction of the global history 140 specifies such a branch instruction that the first branch instruction, which was not hit, will be branched next and that the hit branch instruction is not predicted to be branched next (which is the case of the pattern 4 in FIG. 11). In such a case, the way stored with the hit branch instruction is invalidated (unused way) by setting OFF the valid flag. The registration is sequentially conducted, and it is therefore required that a way other than the hit way is prepared for the first branch instruction predicted to be branched next in order to prevent the first branch instruction from being erased by the erasing operation of the second branch instruction.

Further, as in the pattern 7 in FIG. 11, if the non-hit first branch instruction is executed with the result that this branch instruction is branched, and the branch prediction deviates from the rules, in which case a way for registering this branch instruction needs preparing. Moreover, as in the patterns 5, 6 in FIG. 11, the branch of the next time to the branch destination address of the hit way is predicted, and the non-hit first branch instruction is predicted to be branched next, in which case also a further way other than the hit way needs preparing.

(2) Next, the last pattern (this pattern is a case where the branch is not predicted, which is indicated by (2) in FIG. 8) in FIG. 8 will be described. FIG. 12 shows combination patterns of the execution results and the next predictions. Now, an assumption is a case where the simultaneously fetched 4 instructions contain the 2 branch instructions. Among these instructions, with respect to the patterns 2, 3 and 4, the registering operation occurs in only the first or second branch instruction of the 2 branch instructions, and hence one should-be-registered way may be enough.

On the other hand, when in the patterns 5 and 6, the instruction predicted to be branched next is the first branch instruction of the simultaneously fetched 4 instructions. In the pattern 5, however, the global history 140 predicts also the branch of the second branch instruction in the next execution. Further in the pattern 6, the prediction about the second branch instruction in the current execution is "N_Tk", and nevertheless the execution result is "Tk", resulting in the occurrence of the registering operation.

What is thinkable about the occurrence of this case is that dual loops exist in the program to be executed, in which the first branch instruction configures a small inner loop, and the second branch instruction configures a large outer loop. In this case, the second branch instruction is executed when the first branch instruction (which configures the small inner loop) becomes N_Tk. Accordingly, in such a case, the global history 140 sends a will-be-branched prediction (an instruction to register the branch instruction). In this instance, the way for registering each branch instruction needs preparing. The discussion will hereinafter be made in a way that categorizes the status of the valid flag on a case-by-case basis.

(a): A Case of Having Two or More Invalid Ways

If the invalid ways exist, the priority is given to the invalid ways for the use. The branch prediction apparatus 100 acquires the two ways counted from the lowest in the way number out of the invalid ways. Namely, the branch prediction apparatus 100 performs the way acquiring operation twice according to the operation logic (FIG. 6) of the replace flag when the invalid ways exist, and sends, as a result, the two updated replace flags.

For example, it is assumed that the readout replace flags are given such as (way0, way1, way2, way3)=(0, 0, 0, 1). Further, it is also presumed that the invalid ways are way0, way1, way3.

At this time, the way (the first candidate way), in which the first branch instruction should be registered, becomes way0 when selected in the sequence from, e.g., the lowest in the number. Moreover, the way (the second candidate way), in which the second branch instruction should be registered, becomes way1. Whether the replace flag is inverted or not is based on the operation table in FIG. 6.

For example, the readout replace flags are (0, 0, 0, 1), and the invalid way way0 is used, in which case the replace flag is required to be inverted based on the rule in FIG. 6. Therefore, the way number way0 for the registration and the replace flag 1 (the inversion of 0) are sent as the first candidate to the instruction fetch control unit 123.

At this time, the branch prediction apparatus 100 presumes that the replace flag of way0 temporarily becomes "1" and further continues to select the next way. Namely, the replace flags are assumed such as (way0, way1, way2, way3)=(1, 0, 0, 1). The branch prediction apparatus 100 determines based on this assumption whether the second candidate is inverted or not. To be specific, when the replace flags are (1, 0, 0, 1) and when using the invalid way1, there is no necessity of inverting the replace flag on the basis of FIG. 6.

Such being the case, the branch prediction apparatus 100 sends the way number way1 for the registration and the replace flag "0" as the second candidate. Namely, the branch prediction apparatus 100 determines, through the processes given above, the candidates as follows:
the first candidate: way0, the replace flag=1; and
the second candidate: way1, the replace flag=0.
The branch prediction apparatus 100 sends the determined candidates to the instruction fetch control unit 123.

Then, the instruction fetch control unit 123 refers to the instruction buffer 125 and, if the branch instruction exists therein, attaches the way numbers and the replace flags to the branch instruction in the sequence from the first candidate to the second candidate.

(b) A Case of Having Only One Invalid Way

In this case, the branch prediction apparatus 100 determines the invalid way as the first candidate. Next, the branch prediction apparatus 100 presumes the combination of the replace flags after being operated according to the replace flag operation table (FIG. 6) in a case where the invalid ways exist. Then, the branch prediction apparatus 100 determines the second candidate from the presumed combination of replace flags.

For example, an assumption is that the replace flags are given such as (way0, way1, way2, way3)=(0, 0, 0, 1). Further the invalid way is assumed to be way0.

At this time, the way (the first candidate) for the first branch instruction becomes way0. The replace flags are operated (presumed) based on the operation table. When the replace flags are (0, 0, 0, 1), the replace flag needs inverting in the case of using way0 (see FIG. 6). Then, the branch prediction apparatus 100 sends the way number way0 for the registration and the replace flag 1 (the inversion of 0) as the first candidate.

At this time, the branch prediction apparatus 100 temporarily presumes that the replace flag of way0 becomes "1", and the replace flags are given such as (way0, way1, way2, way3)=(1, 0, 0, 1).

The branch prediction apparatus 100 determines based on this presumption the second candidate. In the second embodiment, it one invalid way is used, all of the remaining ways are valid. In this case, the branch prediction apparatus 100 selects way2 as the replacement target way from the way determination table (see FIG. 5) based on the replace flags and sets the selected way as the second candidate. In this instance, the branch prediction apparatus 100 inverts the replace flag of the selected way2 (the replace flag is unconditionally inverted without conforming to the logic in FIG. 6 because of the valid flag being valid) and thus sends the inverted flag. Namely, the branch prediction apparatus 100 determines, through the processes given above, the candidates as below:
the first candidate: way0, the replace flag 1; and
the second candidate: way2, the replace flag 1.
The branch prediction apparatus 100 sends the determined candidates to the instruction fetch control unit 123.

(c) A Case of Having No Invalid Way

In this case, the branch prediction apparatus 100 selects the candidate from the way determination table (FIG. 5) based on the replace flags. For example, it is presumed that the readout replace flags are given such as (way0, way1, way2, way3)=(0, 0, 0, 1).

The branch prediction apparatus 100 selects way3 as the replacement target way from the way determination table (FIG. 5) based on the replace flags and sets this selected way as the first candidate. The replace flag of way3 is unconditionally inverted and thus sent, and hence it is presumed that a status of the replace flag hereafter is given such as (way0, way1, way2, way3)=(0, 0, 0, 0).

The branch prediction apparatus 100 determines the second candidate on the basis of the presumed replace flags. To be specific, the branch prediction apparatus 100 selects way0 as the replacement target way from the table in FIG. 5 and sets this selected way as the second candidate. At this time, the replace flag of way0 is unconditionally inverted and thus sent. Namely, the branch prediction apparatus 100 determines, through the processes given above, the candidates as below:
the first candidate: way3, the replace flag 0; and
the second candidate: way0, the replace flag 1.
The branch prediction apparatus 100 sends the determined candidates to the instruction fetch control unit 123.

As discussed above, at a point of time when read from the branch history storage device 130, the branch prediction apparatus 100 determines the two candidate ways (the first candidate and the second candidate) and sends the determined candidates to the instruction fetch control unit 123.

The instruction fetch control unit 123 attaches the information on the first candidate and the second candidate (the way numbers and the replace flags) to the branch instructions in the fetched sequence. These pieces of information are retained in an attached-to-the-instruction state by the branch reservation unit 126. Then, together with the execution result of the branch instruction, the branch instruction attached with the information on the first candidate or the branch instruction attached with the information on the second candidate is sent back to the branch prediction apparatus 100.

At this time, the global history 140 notifies the branch prediction apparatus 100 of an instruction showing whether the branch is a branch predicted to be branched next or not. The branch prediction apparatus 100 registers, based on the prediction of the global history 140, the branch instruction in the way having the number assigned to the branch instruction.

<Processing Flow>

The processes of the branch prediction apparatus 100 will be described with reference to the drawings in FIGS. 13 through 18. FIGS. 13 through 17 show a branch history search process executed by the branch prediction apparatus 100. On the other hand, FIG. 18 shows a process after the branch prediction apparatus 100 has temporarily sent the result of the branch prediction and the way information to the instruction fetch control unit 123, and the branch instruction (attached with the way information) has been sent back from the branch reservation unit 126 after decoding and executing the branch instruction.

These processes are basically processes of selecting the 2 ways at the maximum according to the logic shown in FIGS. 5 and 6. Accordingly, the following processes are actualized by a control circuit (a combination of logic gates) for driving a logic circuit twice, which realizes the logic in FIGS. 5 and 6.

Figure 13:
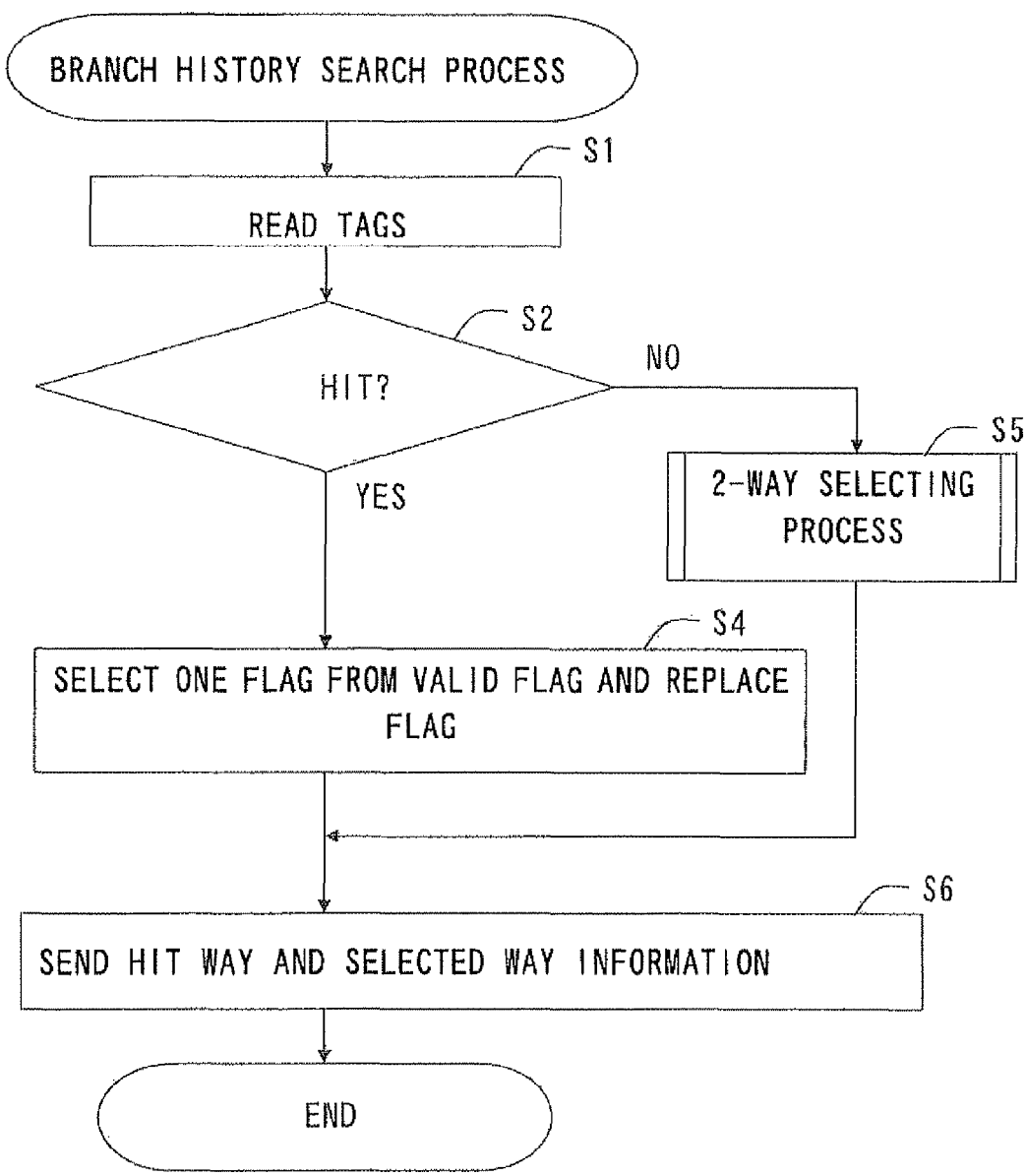
FIG. 13 is a diagram illustrating an outline of a branch history search process executed by the branch prediction apparatus.

As illustrated in FIG. 13, the branch prediction apparatus 100 determines, based on the instruction address, the set in the branch history storage device 130 in accordance with the branch prediction instruction given from the instruction fetch control unit 123. Then, a tag is read from the entry associated with the ways organizing the determined set (S1).

Next, the branch prediction apparatus 100 determines which way the branch instruction is hit in (S2). Namely, the branch prediction apparatus 100, if a content of the hit tag gets coincident with a portion of the instruction address, e.g., an instruction address <31:16>, which should organize the tag, determines that the branch instruction is hit.

If hit, the branch destination address is sent to the instruction fetch control unit 123. Further, the branch prediction apparatus 100 selects the way according to the setting of the present valid flag and replace flag (S4).

To be specific, if there is the invalid way, the priority is given to this way for use. On this occasion, the branch prediction apparatus 100 determines, based on the table in FIG. 6, whether the replace flag is inverted or not. Moreover, whereas if there is no invalid way, the branch prediction apparatus 100 selects the way according to the table in FIG. 5 on the basis of the setting of the present replace flag, As already described in the first embodiment, the process of making the selection in FIG. 5 and determining the inversion or non-inversion in FIG. 6 on the basis of the replace flags can be realized by the combination of the logic gates.

Then, the branch prediction apparatus 100 sends, to the instruction fetch control unit 123, the information on the ways (the hit way and the way selected in S3, or alternatively the two ways selected in S4) (S5).

While on the other hand, if the branch instruction is not hit in any one of the ways, the branch prediction apparatus 100 selects the two ways based on the replace flags (S4). Then, the branch prediction apparatus 100 sends the information on the selected 2 ways to the instruction fetch control unit 123 (S6).

Figure 14:
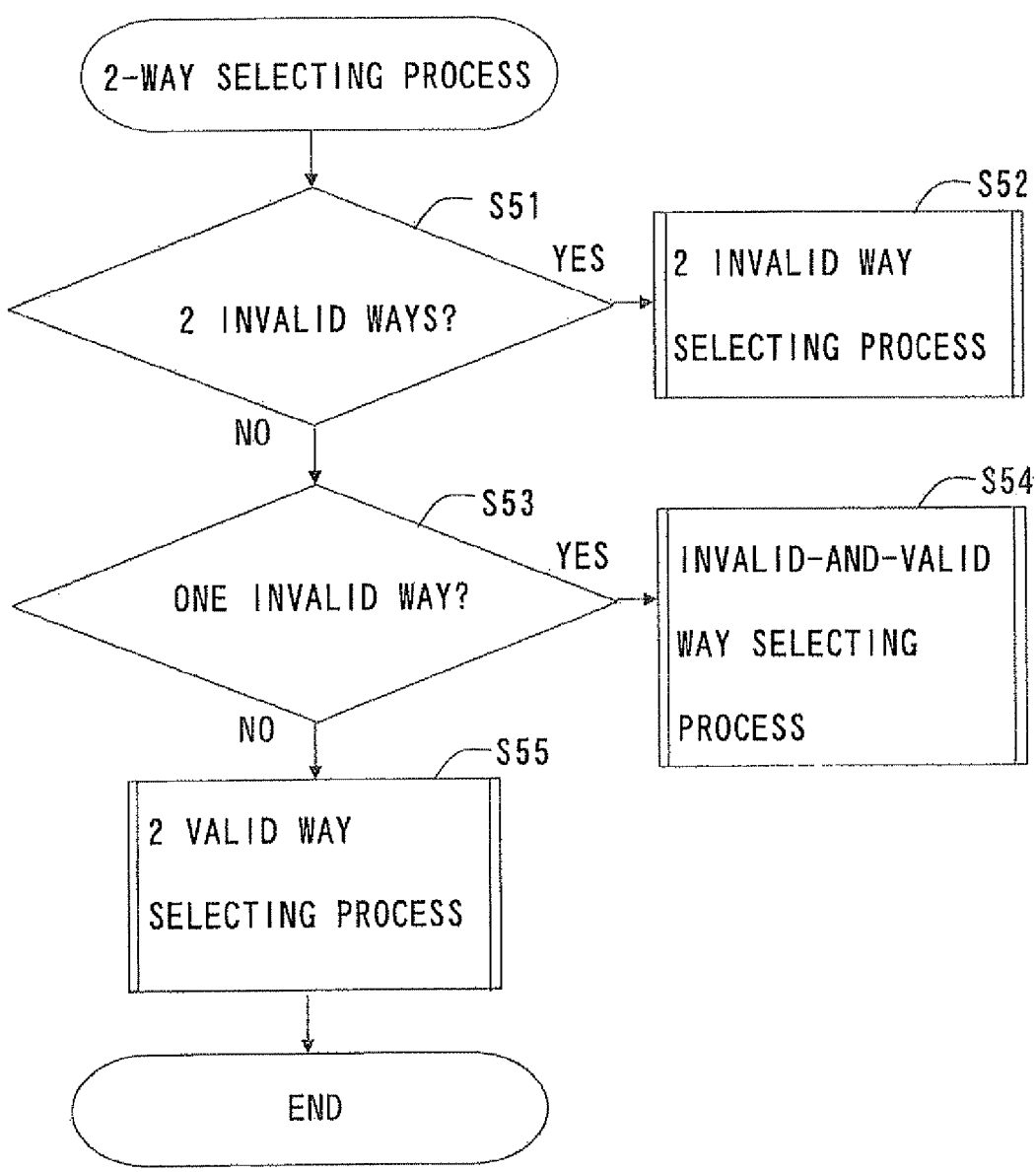
FIG. 14 is a diagram illustrating in detail a process of selecting two ways according to the replace flags.

FIG. 14 shows in detail the process (S5 in FIG. 13, which is referred to as a 2 way selecting process) in which the branch prediction apparatus 100 selects the 2 ways according to the replace flags. In this process, the branch prediction apparatus 100, to begin with, determines whether there are the 2 invalid ways or not (S51). If the two or more invalid ways exist in the set concerned, the branch prediction apparatus 100 executes the two invalid way selecting process (S52).

Further, whereas if there are not the 2 invalid ways, the branch prediction apparatus 100, at first, determines whether there is one invalid way or not (S53). If one invalid way exists in the set concerned, the branch prediction apparatus 100 executes an invalid-and-valid way selecting process (S54).

Moreover, if none of the invalid way exists in the set concerned, the branch prediction apparatus 100 executes a valid 2 way selecting process (S55).

Figure 15:
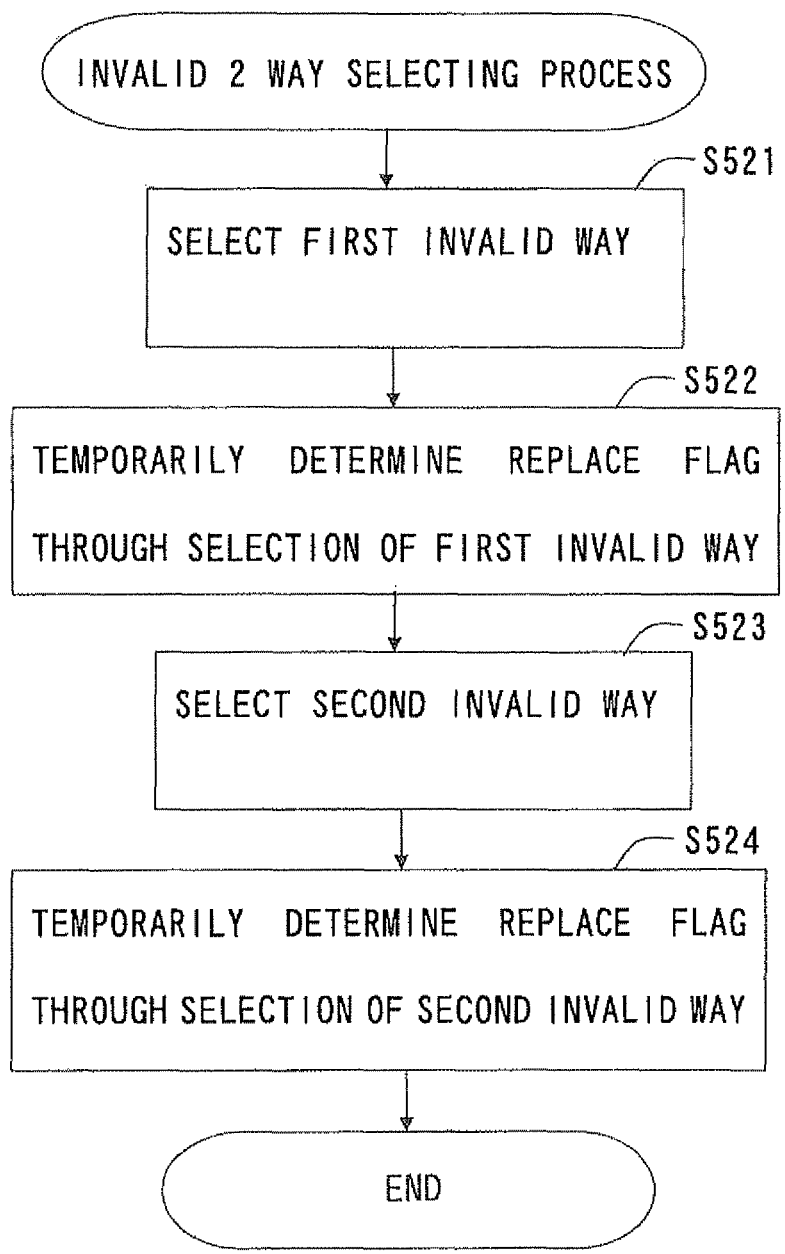
FIG. 15 is a diagram illustrating in detail an invalid way selecting process.

FIG. 15 shows in detail the invalid 2 way selecting process (S52 in FIG. 14). In this process, the branch prediction apparatus 100 refers to the valid flag of the way, thus selecting the first invalid way (S521). A method of selecting which invalid way is not particularly limited. For example, the invalid way may be selected in the sequence from the lowest in the number.

Next, the branch prediction apparatus 100 temporarily determines based on the logic in the table in FIG. 6 whether the replace flag is inverted or not (S522). Moreover, the branch prediction apparatus 100 refers to the valid flag of the way, thus selecting the second invalid way (S523). Then, the branch prediction apparatus 100 further temporarily determines, based on the temporarily determined status of the replace flag in S522 and the logic in the table in FIG. 6, whether the replace flag is inverted or not (S524). Note that these items of way information (the number and the replace flag) are sent in the process in S6 in FIG. 6. With respect to the replace flag of which the inversion has been temporarily determined, after executing the branch instruction, the inversion is finalized on the occasion of storing the branch history.

Figure 16:
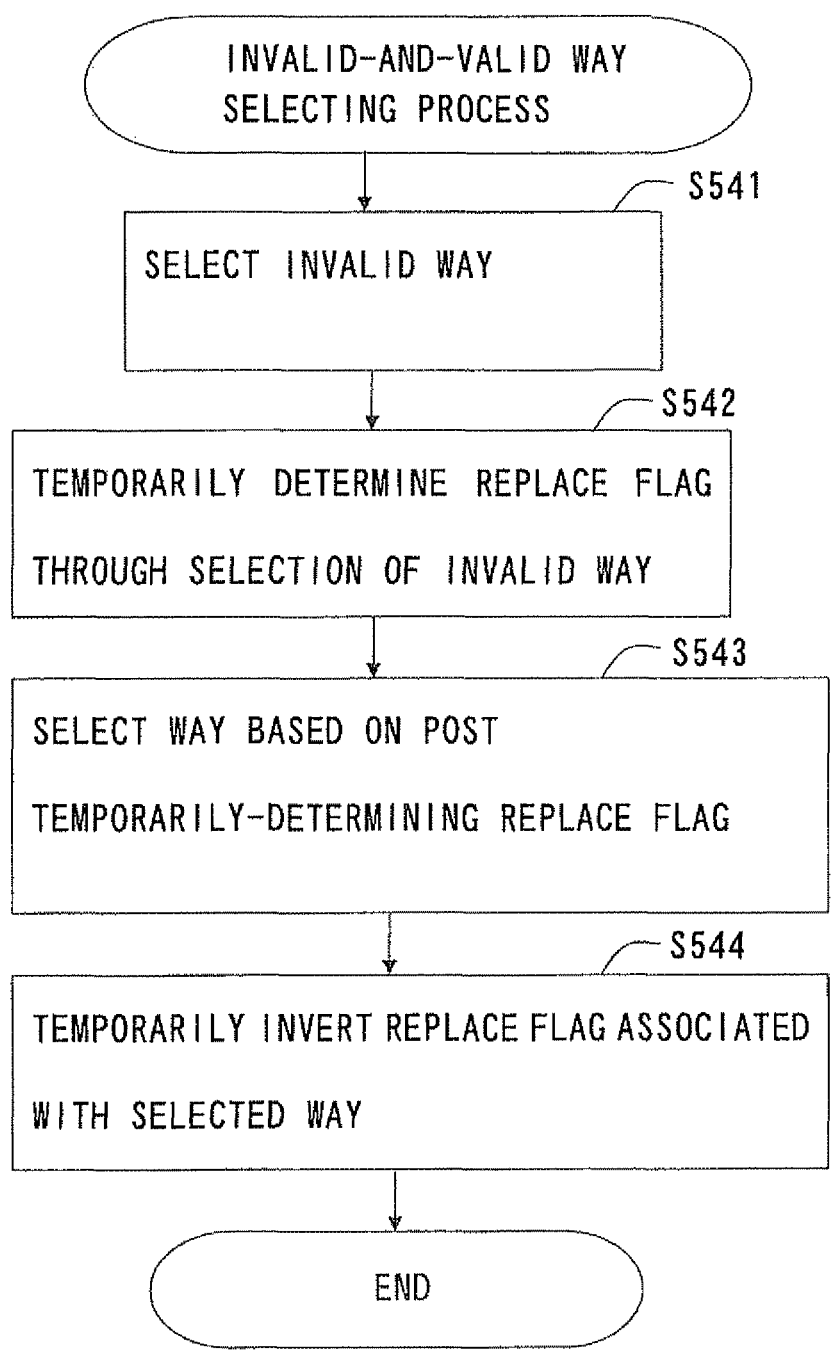
FIG. 16 is a diagram illustrating in detail an invalid-and-valid way selecting process.

FIG. 16 shows in detail an invalid-and-valid way selecting process (S54 in FIG. 14). In this process, the branch prediction apparatus 100 refers to the valid flag of the way and thus selects the invalid way (S541).

Subsequently, the branch prediction apparatus 100 temporarily determines according to the logic in the table in FIG. 6 whether the replace flag is inverted or not (S542). Next, the branch prediction apparatus 100 selects one valid way according to the temporarily determined status of the way (S543). Then, the replace flag of the selected way is temporarily inverted (S524). Note that with respect to the temporarily inverted replace flag, after executing the branch instruction, the inversion is finalized on the occasion of storing the branch history.

Figure 17:
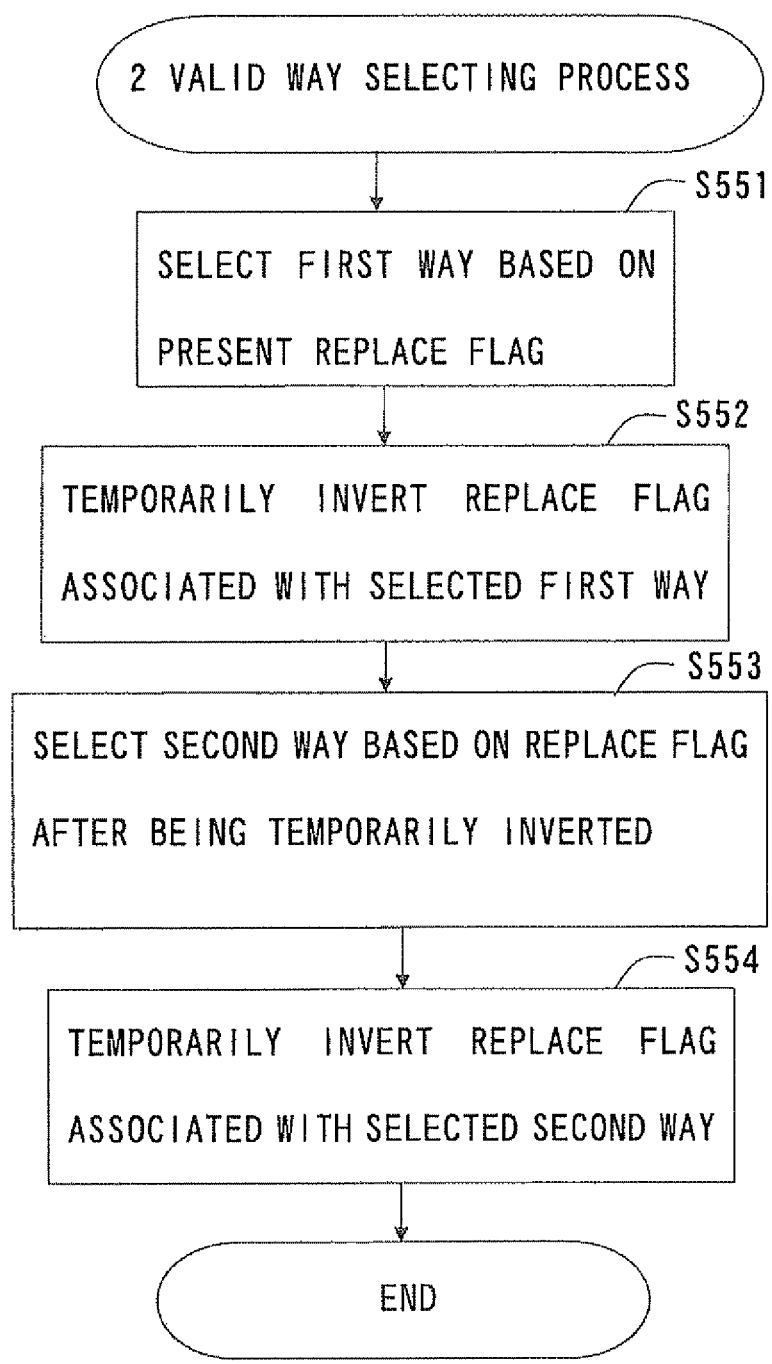
FIG. 17 is a diagram illustrating in detail a valid 2-way selecting process.
Figure 18:
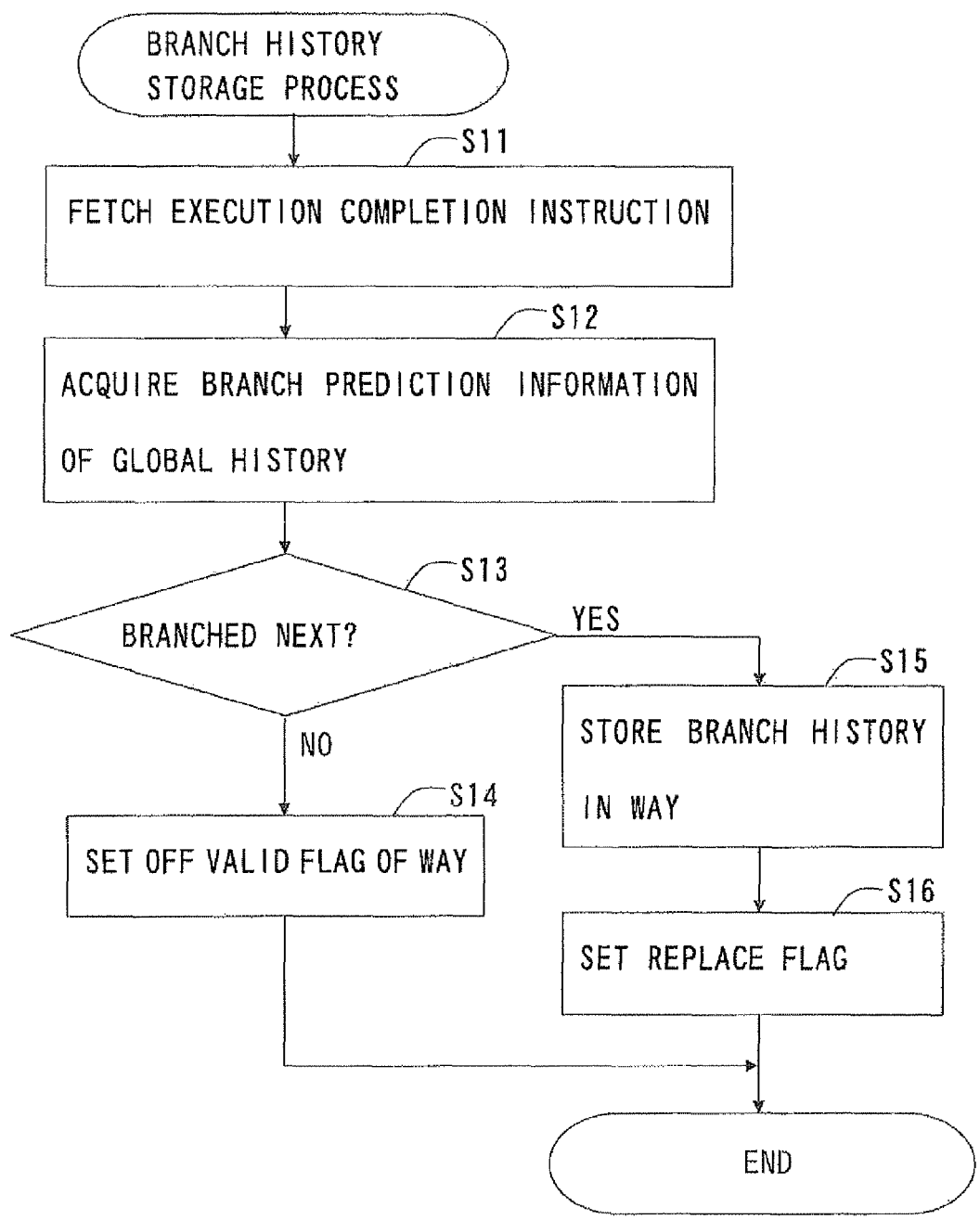
FIG. 18 is a flowchart of a branch instruction storage process.

FIG. 17 shows in detail a 2 valid way selecting process (S55 in FIG. 14). In this process, the branch prediction apparatus 100 refers to the present replace flag, thus selecting the first way (S551).

Subsequently, the branch prediction apparatus 100 temporarily inverts the replace flag of the selected first way (S552). Next, the branch prediction apparatus 100 selects one valid second way based on the temporarily inverted status of the way (S553). Then, the replace flag of the selected second way is inverted (S554).

FIG. 18 shows a flowchart of a branch instruction storage process. In this process, the branch prediction apparatus 100 acquires, from the branch reservation unit 126, the branch instruction of which the execution has been completed or the branch instruction that has been fetched without being branched and the way information (the way number and the temporarily determined inversion or non-inversion) attached to the branch instruction (S11).

Subsequently, the branch prediction apparatus 100 acquires, from the global history 140, the information showing whether the branch instruction will be branched next or not (the prediction by the global history 140) (S12). Note that the prediction itself by the global history 140 is not directly related to the processes in the second embodiment, and hence its explanation is omitted.

Then, the branch prediction apparatus 100 determines whether or not this branch instruction is predicted to be branched next (S13). If it is determined in S13 that the branch instruction shall not branch next, the branch prediction apparatus 100 clears the valid flag of the way and thus invalidates the way (S14). If it is determined in S13 that the branch instruction shall branch next, the branch prediction apparatus 100 stores the branch history (the branch destination address) in the way designated by the information attached to the branch instruction (S15). At this time, a portion of the instruction address is stored as a tag in the entry.

Subsequently, the branch prediction apparatus 100 sets the replace flag based on the information attached to the branch instruction (S16). At this point of time, it follows that the temporarily set content of the replace flag is finalized.

As described above, according to the branch prediction apparatus 100 in the second embodiment, also in the apparatus that fetches the plurality of instructions by one fetching operation, the replace flag can be managed at the efficiency approximate to the efficiency of the LRU algorithm. Namely, though unable to make the selection that is as optimal as the LRU algorithm, the way rewriting operation can be controlled so that the way rewritten based on the tables in FIGS. 5 and 6 is to be rewritten as late as possible (as in the case of the first embodiment, the way rewritten last in the 4 ways in the worst case is rewritten at the third access).

MODIFIED EXAMPLE

The second embodiment has exemplified the process of selecting the way that should be rewritten according to the tables in FIGS. 5 and 6 in the processor where the two or more branch instructions might exist for one fetch, In this process, at the first onset, one way is selected as the way stored with the branch destination addresses of the 2 branch instructions, then the replace flag is thereafter temporarily set, and the second way is determined.

In place of executing such a complicated process, however, the following process may also be carried out.

For instance, an available scheme is that the way number is generated based on the hit way number, and the way is thus selected.

For example, when 2-bit signals representing the four way numbers are given by way<1:0>, there exist bit patterns such as "00", "01", "10", "11". For instance, when the hit way exists, the hit way is selected as the first way and a scheme of selecting the second way is to organize a process of inverting one bit way<1>. In this case, if the hit way is "00", "10" is generated by inverting the higher-order bit, and the way of "10" may be thus selected as the second way. This type of bit operation can be actualized simply by the hardware (the logic gates).

Moreover, this scheme may, e.g., give the priority to the valid flag used in the first and second embodiments. To be specific, when the hit ways exist and when the second way is selected (S4 in FIG. 13), at first, it may be determined from the valid flag whether the invalid way exists or not. Then, if the invalid way exists, this invalid way is selected as the second way, and, whereas if the invalid way does not exist, the way other than the hit way may be chosen as the second way through the bit inversion described above. This control scheme enables the invalid way to be effectively utilized and the overwriting of the hit way to be reduced to the greatest possible degree.

Further, if not hit, the way determined from the replace flag is set as one candidate as normally done, and the same process as in the case of having the hit way number described above may be performed based on the way number of the candidate. More specifically, when the 2-bit signals representing the four way numbers determined from the replace flags are given by way<1:0>, there exist the bit patterns such as "00", "01, "10", "11". From here, the scheme is to generate another way number by the process of inverting one bit way<1>. For instance, if the way for the first branch instruction based on the original replace flag is "00", "10" is generated by inverting the higher-order bit, and this may be set as the way for the second branch instruction.

Figure 19:
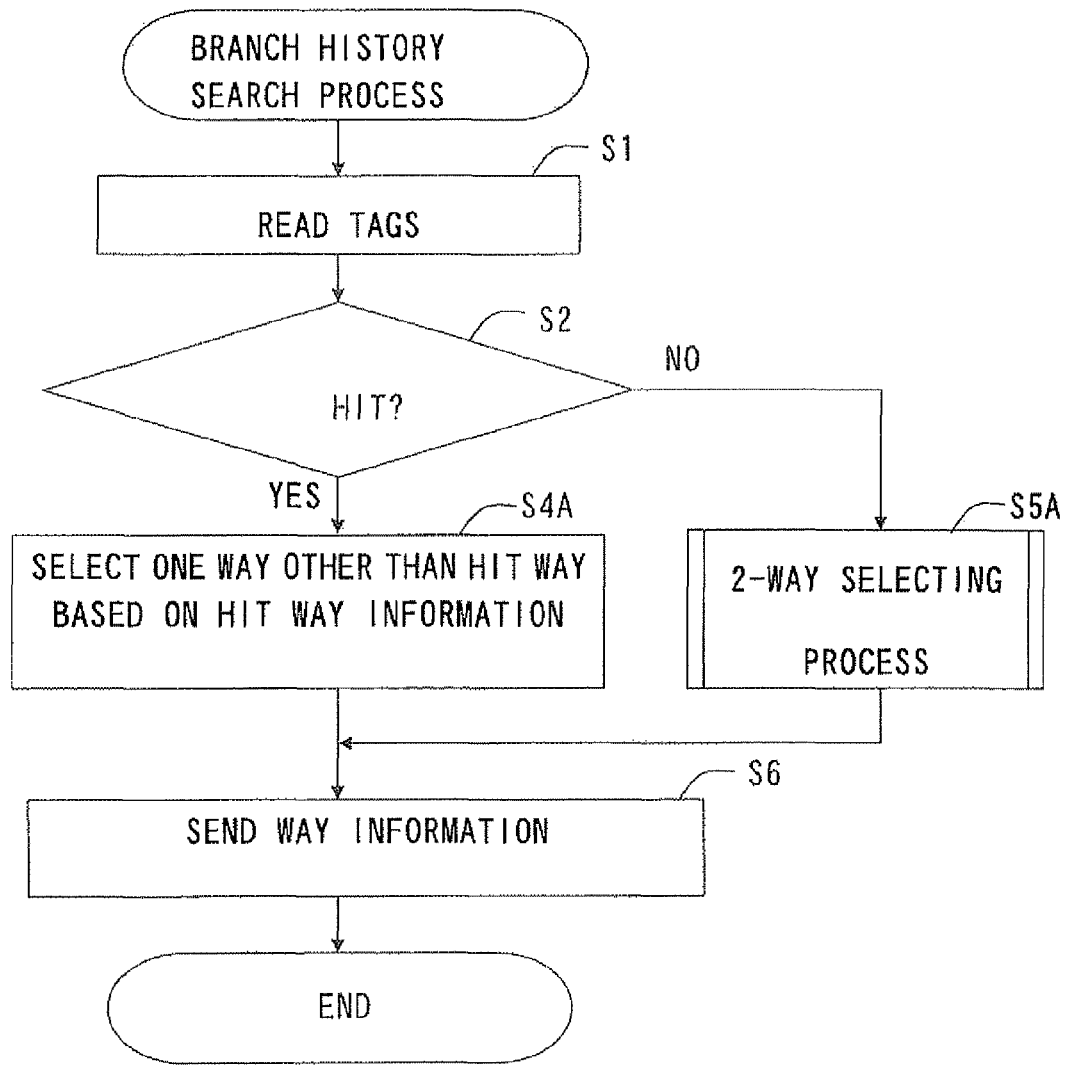
FIG. 19 is a diagram illustrating an outline of the branch history search process executed by the branch prediction apparatus according to a modified example.

FIG. 19 shows a flowchart of the branch history search process according to the modified example given above. The same processes (steps) in FIG. 19 as those in FIG. 13 are marked with the same reference symbols.

Namely, as in FIG. 19, if the branch prediction is hit, the branch prediction apparatus 100 selects, based on the hit way information, a single way other than the hit way (S4A).

Whereas if not hit, the branch prediction apparatus 100 executes the 2 way selecting process (S5A). The 2 way selecting process in this case may be the same as in FIG. 14. Further, the 2 way selecting process may involve setting, as described above, the way determined from the valid flag and the replace flag as one candidate as normally done, then executing the same bit inverting process as in the case of having the hit way number on the basis of the way number of this one candidate and thus setting the way as the second candidate.

What is claimed is:

1. A branch prediction apparatus of a processor, comprising:
   a fetching unit that fetches a plurality of instructions including a first branch instruction and a second branch instruction from an instruction storage source based on a single instruction address;
   a branch instruction predicting unit that predicts whether an instruction to be executed by the processor is a branch instruction based on branch history information of a plurality of instructions executed in past; and
   an execution unit that executes at least one of the fetched plurality of instructions,
   the branch instruction predicting unit including:
      a history storage module that stores a branch destination address of the executed branch instruction as the branch history information in a storage location selected from any one of a plurality of storage locations of the history storage module determined from the single instruction address of the fetched plurality of instructions;
      an update module that updates a selection information for selecting a first storage location and a second storage location from the plurality of storage locations of the history storage module, to select different storage locations for a first branch destination address of the first branch instruction and a second branch destination address of the second branch instruction after the first branch destination address is stored in the history storage module;
      a selection module that selects a first storage location for the first branch destination address and a second storage location for the second branch destination address simultaneously, wherein the selection module selects the storage location for the second branch destination address based on the updated selection information; and
      a storage control module that controls the history storage module to store the first branch destination address and the second branch destination address in the selected storage locations.

2. The branch prediction apparatus of the processor according to claim 1, wherein the selection information contains 1-bit write sequence information, with respect to each of the plurality of storage locations, for specifying a write sequence to the plurality of storage locations determined by the single instruction address, and the selection module selects the storage location of the branch destination address according to the 1-bit write sequence information.

3. The branch prediction apparatus of the processor according to claim 1, wherein the selection module, if there are more than one branch destination addresses to be stored in the plurality of storage locations and if a first branch destination address is an address retrieved from any one of the plurality of storage locations by the history storage module, sets a storage location stored with the first branch destination address as a first storage location, and selects a second storage location based on the updated selection information.

4. The branch prediction apparatus of the processor according to claim 1, wherein the selection module, if there are more than one branch addresses to be stored in the plurality of storage locations and if a first branch destination address is not an address retrieved from any one of the plurality of storage locations by the history storage module, selects a first storage location based on the selection information, then updates the selection information, and selects a second storage location based on the updated selection information.

5. The branch prediction apparatus of the processor according to claim 1, wherein the selection information contains flag information showing whether a storage content of each of the plurality of storage locations is valid or invalid, and the selection module preferentially selects a storage location of which the storage content is shown to be invalid by the flag information.

6. The branch prediction apparatus of a processor according to claim 1, wherein the selection module, when the first branch destination address is an address retrieved from any one of the plurality of storage locations by the history storage module, sets the storage location stored with the first branch destination address as a first storage location, and selects a second storage location other than the first storage location based on the updated selection information.

7. The branch prediction apparatus of the processor according to claim 6, wherein the selection information contains flag information showing whether a storage content of each of the plurality of storage locations is valid or invalid, and the selection module preferentially selects a storage location of which the storage content is shown to be invalid by the flag information.

8. The branch prediction apparatus of the processor according to claim 1, wherein the selection module when the first branch destination address is not an address retrieved from any one of the plurality of storage locations by the history storage module, selects the first storage location according to the selection information before updated, and selects the second storage location based on the updated selection information other than the first storage location.

* * * * *

UNITED STATES PATENT AND TRADEMARK OFFICE
CERTIFICATE OF CORRECTION

PATENT NO. : 8,578,140 B2
APPLICATION NO. : 12/196486
DATED : November 5, 2013
INVENTOR(S) : Megumi Yokoi Page 1 of 1

It is certified that error appears in the above-identified patent and that said Letters Patent is hereby corrected as shown below:

On the Title Page Item (57), In Column 2 (Abstract), Line 6, Delete "information," and insert
-- information. --, therefor.

Signed and Sealed this
Eleventh Day of February, 2014

Michelle K. Lee
*Deputy Director of the United States Patent and Trademark Office*